US011874628B2

(12) United States Patent
Ao

(10) Patent No.: US 11,874,628 B2
(45) Date of Patent: Jan. 16, 2024

(54) DEVELOPING CARTRIDGE

(71) Applicant: JIANGXI YIBO E-TECH CO. LTD., Xinyu (CN)

(72) Inventor: Shiping Ao, Xinyu (CN)

(73) Assignee: JIANGXI YIBO E-TECH CO. LTD., Xinyu (CN)

( * ) Notice: Subject to any disclaimer, the term of this patent is extended or adjusted under 35 U.S.C. 154(b) by 0 days.

(21) Appl. No.: 18/236,433

(22) Filed: Aug. 22, 2023

(65) Prior Publication Data

US 2023/0393520 A1 Dec. 7, 2023

Related U.S. Application Data

(63) Continuation of application No. PCT/CN2022/138241, filed on Dec. 10, 2022.

(30) Foreign Application Priority Data

Dec. 17, 2021 (CN) ......................... 202123186229.3
Dec. 24, 2021 (CN) ......................... 202123284036.1
(Continued)

(51) Int. Cl.
*G03G 21/18* (2006.01)
*G03G 21/16* (2006.01)
*G03G 15/08* (2006.01)

(52) U.S. Cl.
CPC ....... *G03G 21/186* (2013.01); *G03G 15/0872* (2013.01); *G03G 21/1647* (2013.01); *G03G 21/1676* (2013.01); *G03G 2221/1657* (2013.01)

(58) Field of Classification Search
CPC ............. G03G 21/186; G03G 15/0872; G03G 21/1647; G03G 21/1676; G03G 2221/1657; G03G 15/0896
See application file for complete search history.

(56) References Cited

U.S. PATENT DOCUMENTS 9,946,198 B2 4/2018 Itabashi
2013/0051833 A1* 2/2013 Itabashi ............ G03G 21/1676 399/119
(Continued)

FOREIGN PATENT DOCUMENTS

CN 101916059 A 12/2010
CN 102163029 A 8/2011
(Continued)

*Primary Examiner* — Francis C Gray
(74) *Attorney, Agent, or Firm* — IPro, PLLC

(57) ABSTRACT

A developing cartridge for an imaging device may include: a housing; a developer roller supported by the housing and configured to rotate about an axis of the developer roller; and a coupling gear on a first side of the housing and configured to rotate; a transmission rod configured to move in response to a rotation of the coupling gear, a first part of the transmission rod on the first side of the housing; a first protrusion movably mounted on a second side of the housing, and configured to move in response to a movement of the transmission rod; and a second protrusion on the first side of the housing, extending toward the second side of the housing, and the second protrusion comprising a guide surface configured to cause the transmission rod to move toward the second side of the housing in response to the rotation of the coupling gear.

27 Claims, 20 Drawing Sheets

(30) Foreign Application Priority Data

| | | |
|---|---|---|
| Dec. 29, 2021 | (CN) | 202123353961.5 |
| Mar. 4, 2022 | (CN) | 202220461237.X |

(56) References Cited

U.S. PATENT DOCUMENTS

| | | | | |
|---|---|---|---|---|
| 2017/0097588 | A1* | 4/2017 | Fukamachi | G03G 21/1647 |
| 2018/0239300 | A1* | 8/2018 | Wen | G03G 21/1857 |
| 2018/0284688 | A1* | 10/2018 | Shimizu | G03G 21/1676 |
| 2018/0284689 | A1* | 10/2018 | Shimizu | G03G 21/1676 |
| 2020/0409290 | A1* | 12/2020 | Saeki | G03G 21/1814 |

FOREIGN PATENT DOCUMENTS

| | | | |
|---|---|---|---|
| CN | 102968029 | A | 3/2013 |
| CN | 104950640 | A | 9/2015 |
| CN | 205450563 | U | 8/2016 |
| CN | 106325023 | A | 1/2017 |
| CN | 212515361 | U | 2/2021 |
| CN | 113671810 | A | 11/2021 |
| CN | 215219434 | U | 12/2021 |
| CN | 114236989 | A | 3/2022 |
| CN | 114879462 | A | 8/2022 |
| CN | 219143282 | U | 6/2023 |
| CN | 116449660 | A | 7/2023 |
| JP | 2014029564 | A | 2/2014 |
| WO | 2023109723 | A1 | 6/2023 |
| WO | 2023109949 | A1 | 6/2023 |

* cited by examiner

DEVELOPING CARTRIDGE

BACKGROUND

An electronic imaging device is a device that forms an image on a recording material through the principle of electrophotographic imaging, for example, an electrophotographic copier, a laser printer, an electrophotographic printer (such as a laser printer and an LED printer, etc.), a fax machine, and a word processor. The imaging device usually includes a developing cartridge and a drum cartridge. The developing cartridge supplies a developer to the drum cartridge that has been formed with an electrostatic latent image. A visible developer image corresponding to the electrostatic latent image is formed on a pho to sensitive drum of the drum cartridge. Then, the developer image is transferred onto a recording medium through transferring, and finally the developer image is fixed onto the recording medium through fixing. Finally, the recording medium is discharged from an image forming apparatus to complete the printing operation.

SUMMARY

Disclosed herein is a developing cartridge, comprising: a housing; a developer roller supported by the housing and configured to rotate about an axis of the developer roller; and a coupling gear located on a first side of the housing, and configured to rotate by receiving a driving force; a transmission rod configured to move in response to a rotation of the coupling gear, a first part of the transmission rod located on the first side of the housing; a first protrusion movably mounted on a second side of the housing, and configured to move in response to a movement of the transmission rod; and a second protrusion on the first side of the housing, extending toward the second side of the housing, and the second protrusion comprising a guide surface configured to cause the transmission rod to move toward the second side of the housing in response to the rotation of the coupling gear.

In an aspect, the guide surface is inclined with respect to the axis of the developer roller.

In an aspect, the housing comprises a plate on the first side of the housing and supporting the second protrusion, and an included angle between an extending direction of the guide surface and an extending direction of the plate is an obtuse angle.

In an aspect, the second protrusion further comprises an urging surface arranged adjacent to the guide surface, and the guide surface is inclined relative to the urging surface.

In an aspect, the second protrusion further comprises an urging surface, one end of the guide surface is adjacent to the plate, and another end of the guide surface is adjacent to the urging surface.

In an aspect, the extending direction of the plate is parallel to an extending direction of the urging surface.

In an aspect, the developing cartridge further comprises a compression spring mounted on the transmission rod and configured to cause the transmission rod to move toward the second side of the housing. One end of the compression spring abuts the housing, and another end of the compression spring abuts the transmission rod, and the compression spring is configured to be compressed in response to the rotation of the coupling gear.

In an aspect, a second part of the transmission rod is located on the second side of the housing, and the first protrusion is mounted on the second part of the transmission rod and movable relative to the transmission rod.

In an aspect, the first protrusion is configured to move in a direction different from a moving direction of the transmission rod, under a driving force from the transmission rod.

In an aspect, the developing cartridge further comprises a transmission gear on the first side of the housing and configured to rotate in response to the rotation of the coupling gear.

The second protrusion is on the transmission gear.

In an aspect, the guide surface of the second protrusion is configured to force the transmission rod to move by contacting the transmission rod.

In an aspect, the developing cartridge further comprises an agitator inside the housing configured to agitate a developer. The transmission gear is mounted at an end of the agitator.

In an aspect, the developing cartridge further comprises two idler gears between the transmission gear and the coupling gear.

In an aspect, the developing cartridge further comprises an electrode electrically connected to the developer roller. The electrode has an electrical contact surface on the second side of the housing, and the electrical contact surface is between the developer roller and the transmission rod.

In an aspect, the housing comprises a container configured to accommodate a developer, and the transmission rod is outside the container.

Also disclosed herein is a developing cartridge, comprising: a housing; a developer roller supported by the housing and configured to rotate about an axis of the developer roller; a developer feeding roller supported by the housing and configured to rotate about an axis of the developer feeding roller; and a coupling gear on a first side of the housing, and configured to rotate by receiving a driving force; a transmission rod configured to move in response to a rotation of the coupling gear, a first part of the transmission rod located on the first side of the housing; an elastic member between the housing and the transmission rod, configured to cause the transmission rod to move; a first protrusion on a second side of the housing and configured to move in response to a movement of the transmission rod; and an electrode electrically connected to the developer roller or the developer feeding roller and having an electrical contact surface on the second side of the housing. The electrical contact surface is between the developer roller and the transmission rod.

In an aspect, the first protrusion is integrally molded with the transmission rod.

In an aspect, the developing cartridge further comprises a transmission gear configured to move the transmission rod. The elastic member is located on the first side of the housing. The transmission gear is configured to cause the transmission rod to move against the elastic member.

When the transmission gear is disengaged from the transmission rod, the elastic member is configured to move the transmission rod.

In an aspect, the elastic member is on the first side of the housing, the transmission gear, the transmission rod and the first protrusion are sequentially arranged along the axis of the developer roller.

In an aspect, a protruding portion is provided on the transmission rod, and the elastic member is mounted on the protruding portion.

In an aspect, the housing comprises a container configured to accommodate a developer, the transmission rod is located outside the container, and the elastic member is between the first side of the housing and the second side of the housing.

Further disclosed herein is a developing cartridge, comprising: a housing; a developer roller supported by the housing and configured to rotate about an axis of the developer roller; and a coupling gear located on a first side of the housing, and configured to rotate by receiving a driving force; a transmission rod configured to move in response to a rotation of the coupling gear, a first part of the transmission rod located on the first side of the housing, and a second part of the transmission rod located on a second side of the housing; and a first protrusion on the second side of the housing and configured to move in response to a movement of the transmission rod. The transmission rod is movably mounted on the housing, and the transmission rod is restricted to rotate about an axis parallel to the axis of the developer roller.

In an aspect, the first protrusion is integrally molded with the transmission rod.

In an aspect, the developing cartridge further comprises a second protrusion on the first side of the housing, extending toward the second side of the housing, and configured to cause the transmission rod to move relative to the housing in response to the rotation of the coupling gear.

In an aspect, the developing cartridge further comprises an elastic member mounted on the transmission rod and configured to cause the transmission rod to move. One end of the elastic member abuts the housing and another end of the elastic member abuts the transmission rod.

In an aspect, a protruding portion is provided on the transmission rod, and the elastic member is mounted on the protruding portion.

In an aspect, the housing comprises a container configured to accommodate a developer, the transmission rod is located outside the container, and the developing cartridge further comprises an elastic member between the first side of the housing and the second side of the housing.

DETAILED DESCRIPTION

Figure 1:
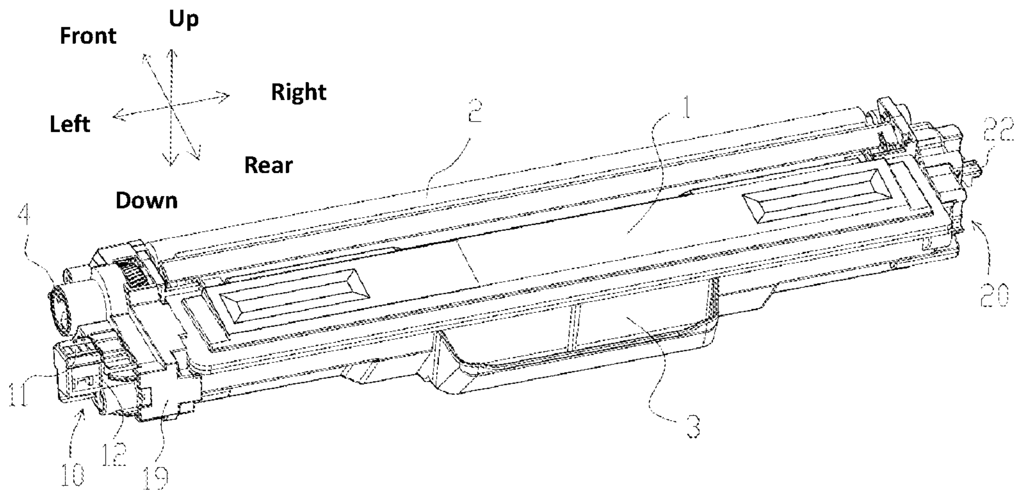
FIG. 1 is a schematic view of a developing cartridge according to Embodiment 1.
Figure 2:
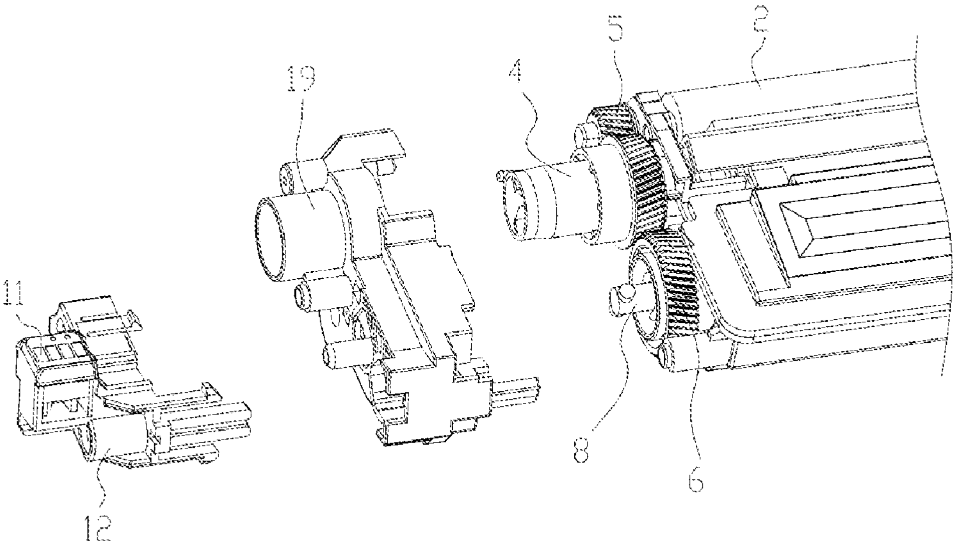
FIG. 2 is an exploded schematic view of a driving side of the developing cartridge according to Embodiment 1.
Figure 3:
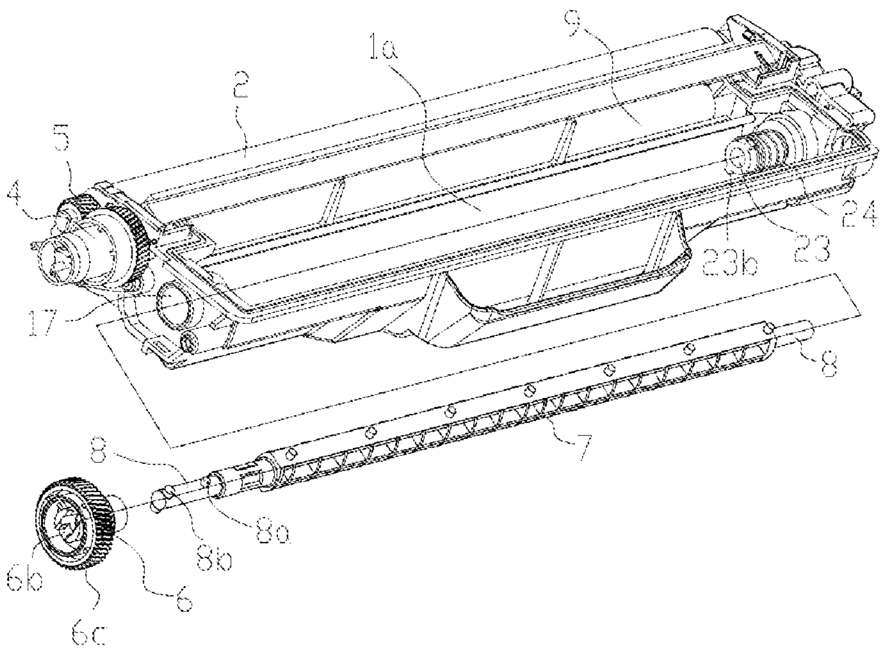
FIG. 3 is an exploded schematic view of the developing cartridge according to Embodiment 1 from an angle.
Figure 4:
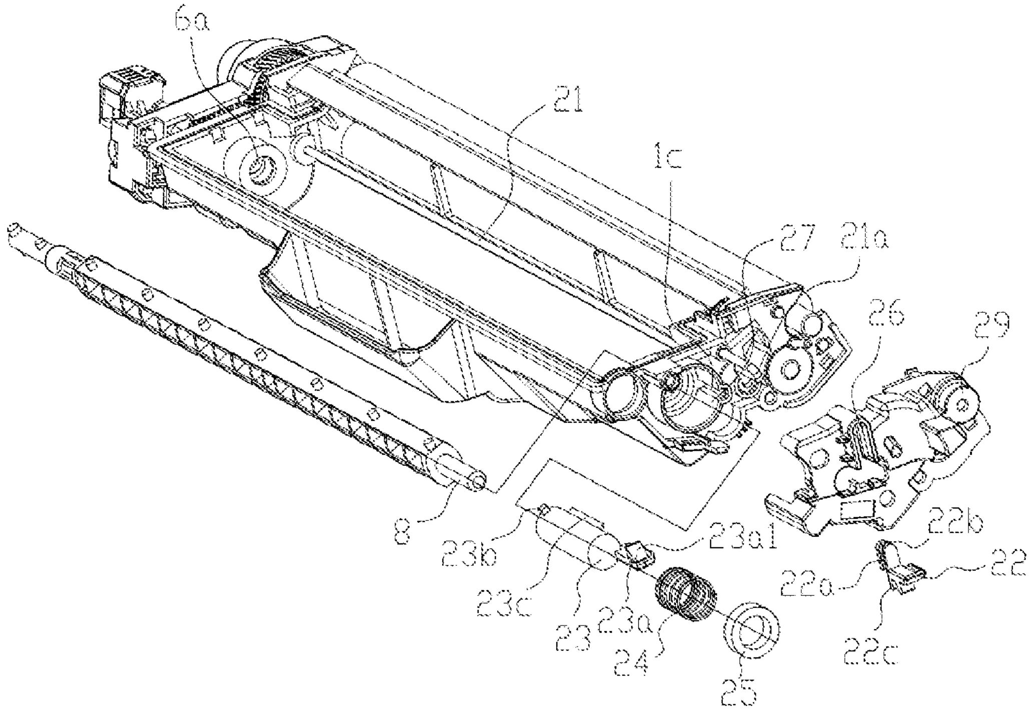
FIG. 4 is an exploded schematic view of the developing cartridge according to Embodiment 1 from another angle.
Figure 5:
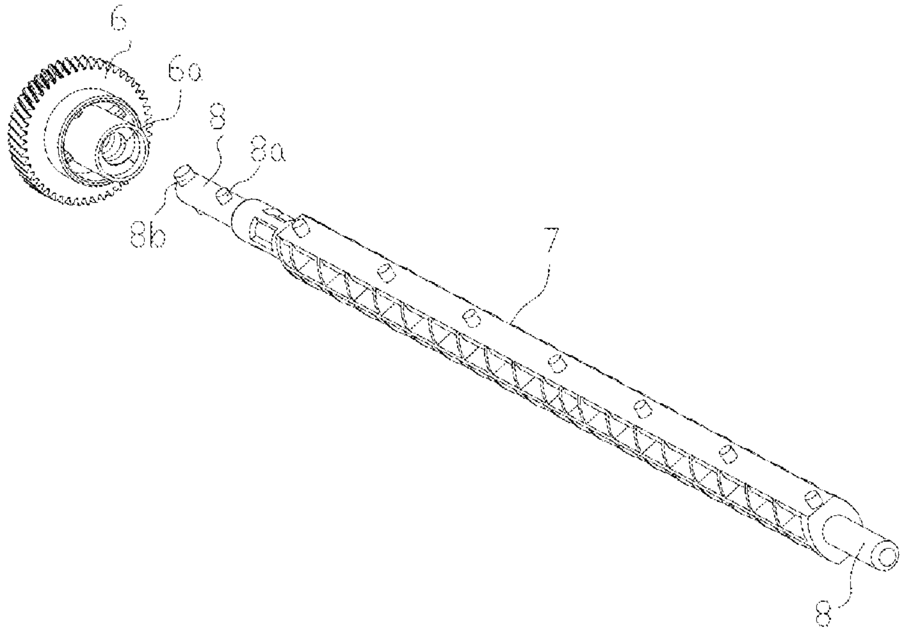
FIG. 5 is a schematic view of an agitator shaft and an agitator gear of the developing cartridge according to Embodiment 1.
Figure 6:
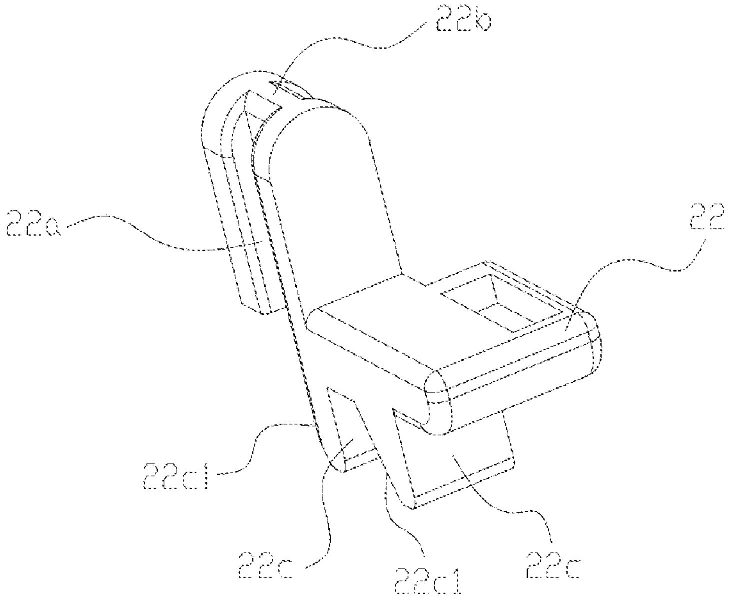
FIG. 6 is a schematic view of a toggle member of the developing cartridge according to Embodiment 1.
Figure 7:
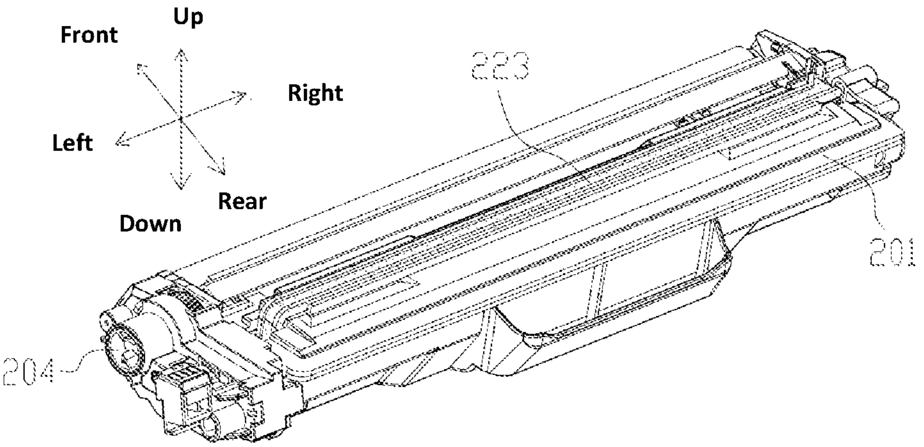
FIG. 7 is a schematic view of a developing cartridge according to Embodiment 2 from an angle.
Figure 8:
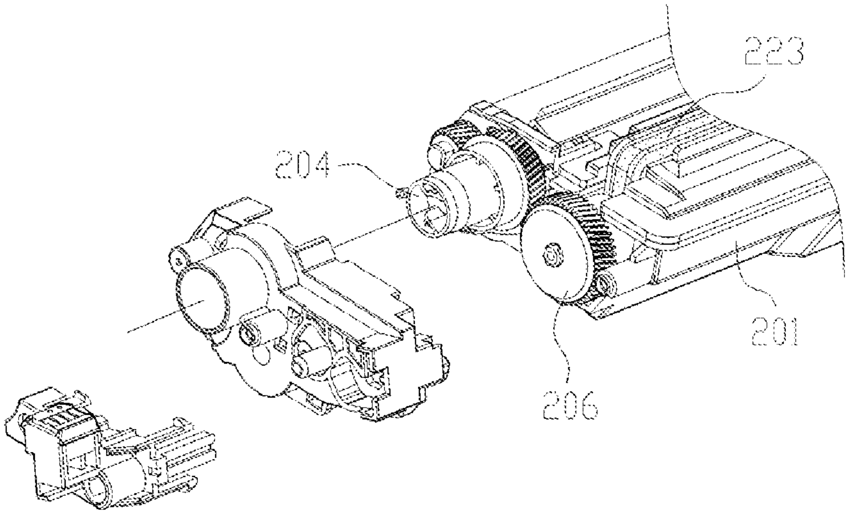
FIG. 8 is an exploded schematic view of a driving side of the developing cartridge according to Embodiment 2.
Figure 9:
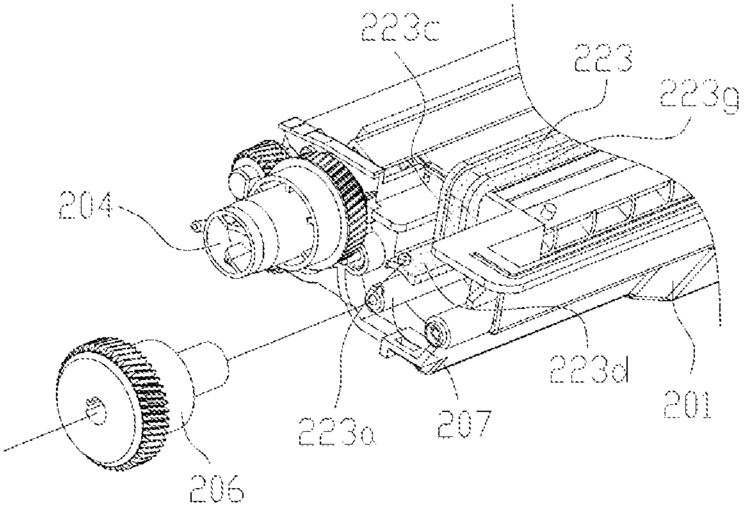
FIG. 9 is an exploded schematic view showing that an agitator gear is disassembled from the developing cartridge according to Embodiment 2.
Figure 10:
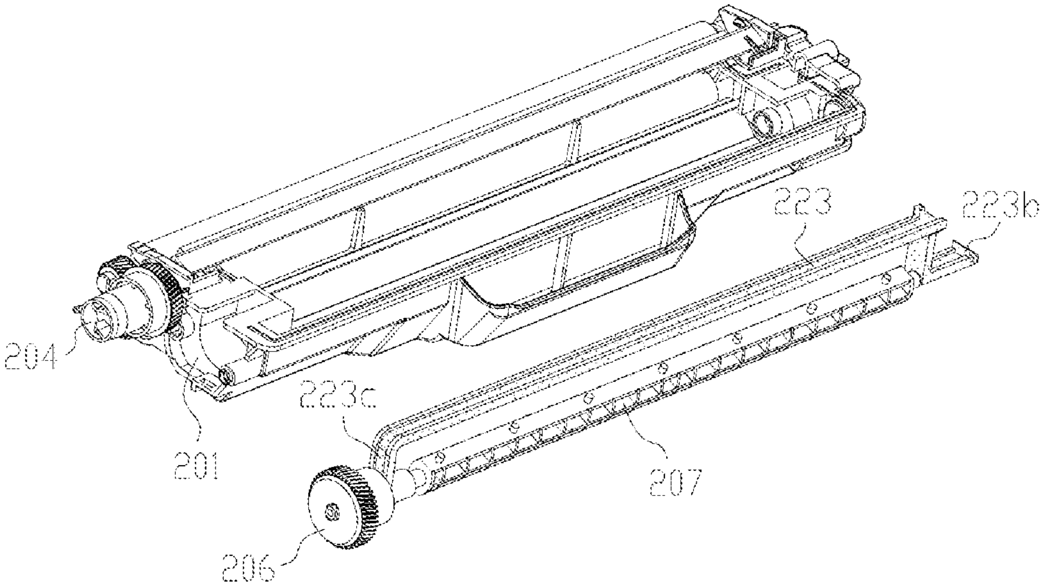
FIG. 10 is an exploded schematic view showing that a transmission component, an agitator shaft and the agitator gear are disassembled from the developing cartridge according to Embodiment 2.
Figure 11:
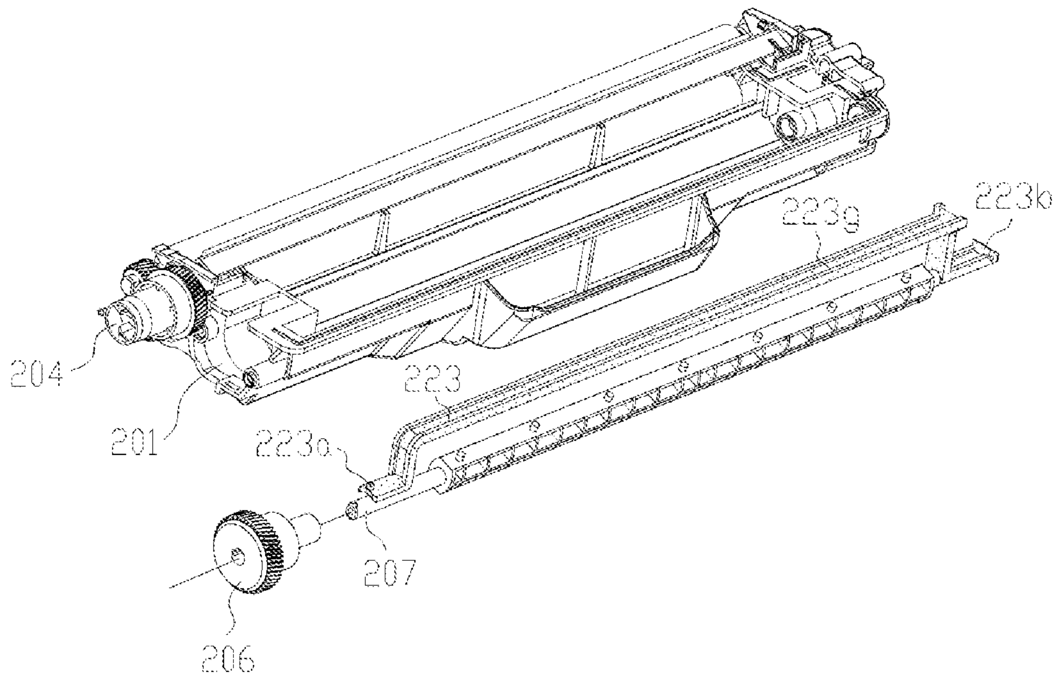
FIG. 11 is an exploded schematic view of the developing cartridge according to Embodiment 2 from an angle.
Figure 12:
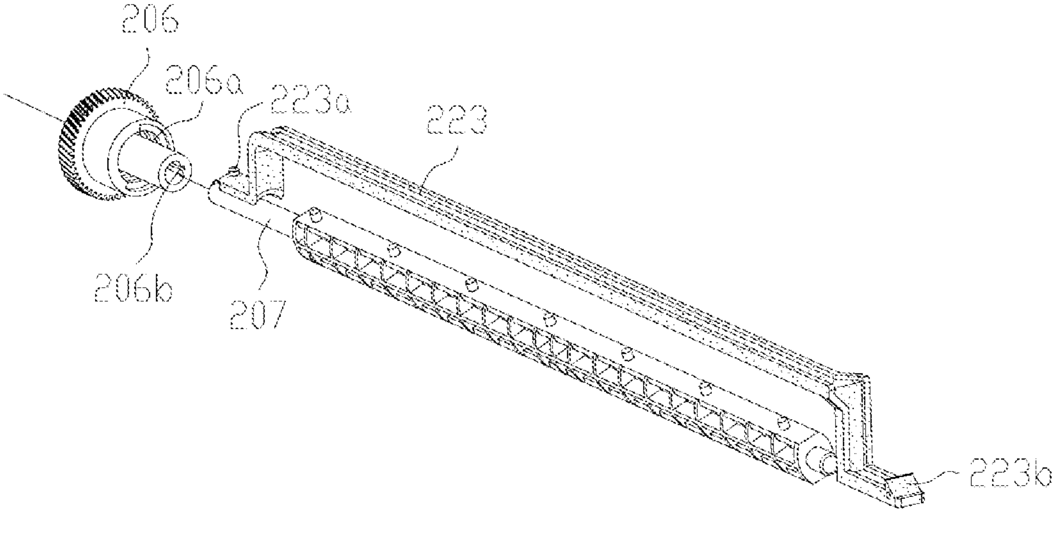
FIG. 12 is a schematic view of the assembly relationship of the transmission component, the agitator shaft and the agitator gear according to Embodiment 2.
Figure 13:
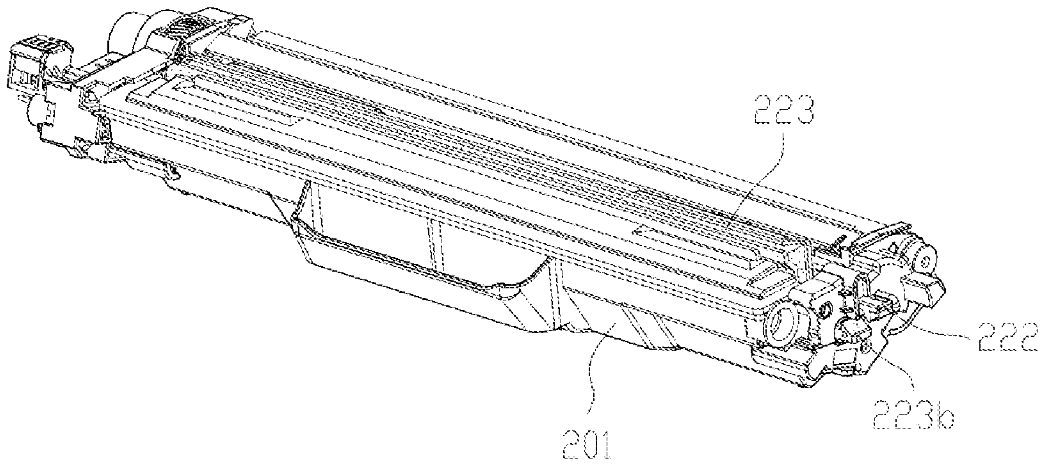
FIG. 13 is a schematic view of the developing cartridge according to Embodiment 2 from another angle.
Figure 14:
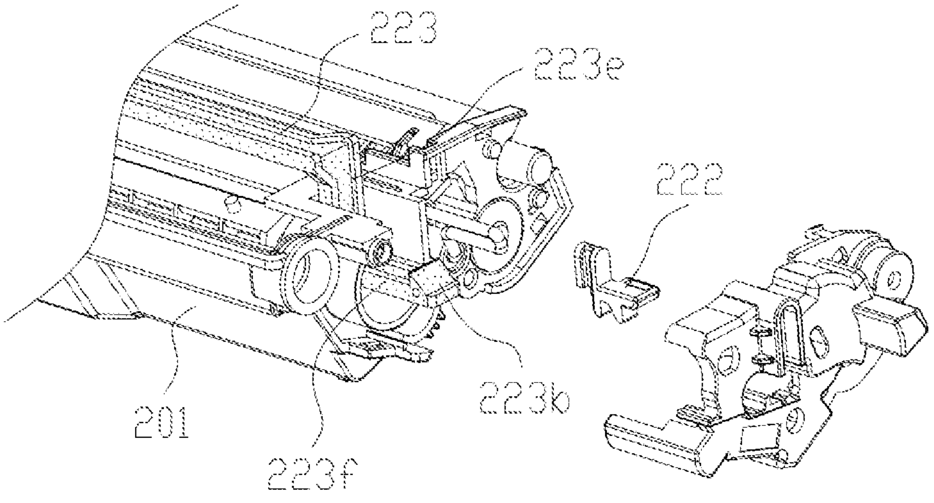
FIG. 14 is an exploded schematic view of a conductive side of the developing cartridge according to Embodiment 2.
Figure 15:
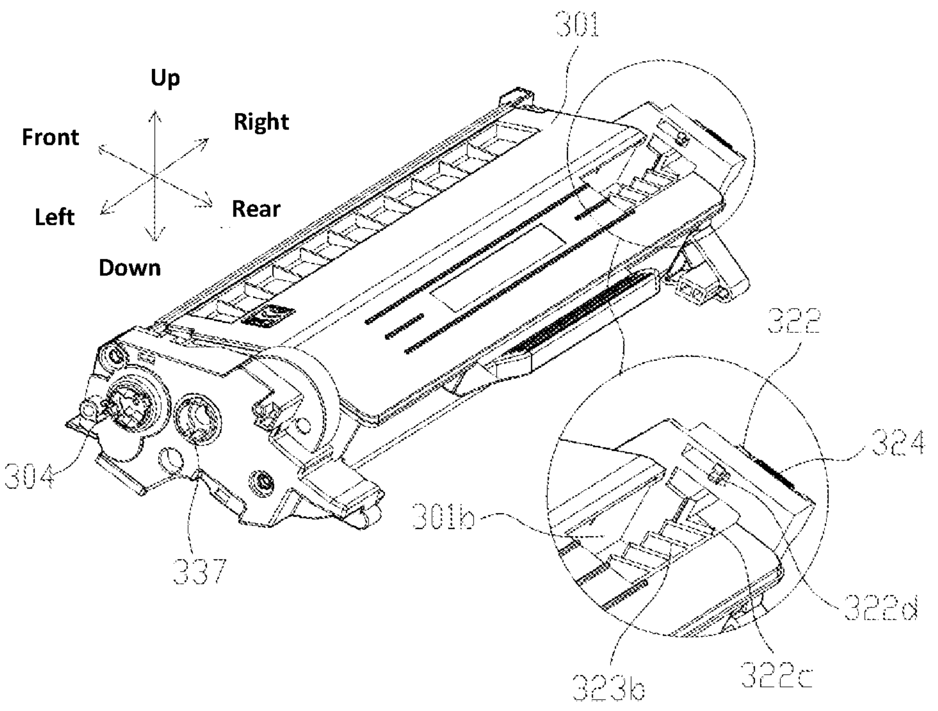
FIG. 15 is a schematic view of a developing cartridge according to Embodiment 3 from an angle.
Figure 16:
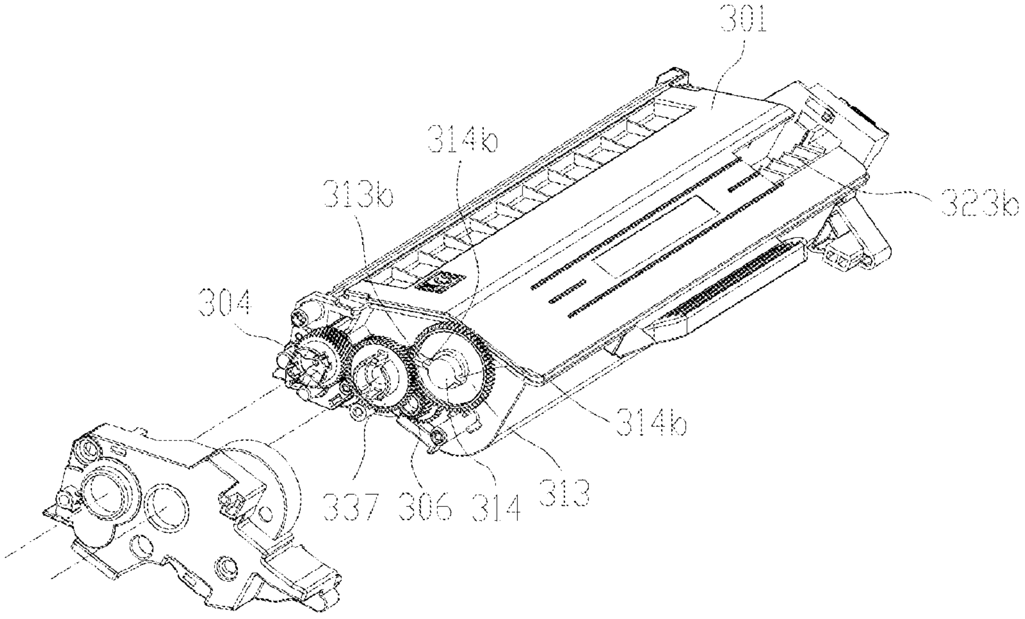
FIG. 16 is an exploded schematic view of a driving side of the developing cartridge according to Embodiment 3.
Figure 17:
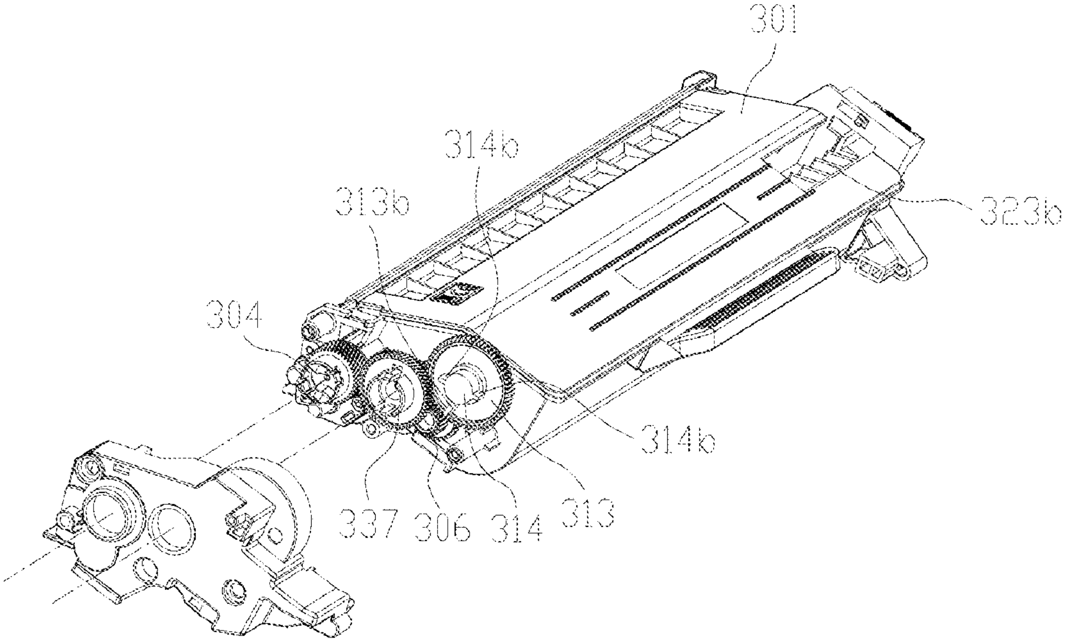
FIG. 17 is an exploded schematic view of the driving side of the developing cartridge according to Embodiment 3, in which a driving portion is rotated between a pair of driven portions.
Figure 18:
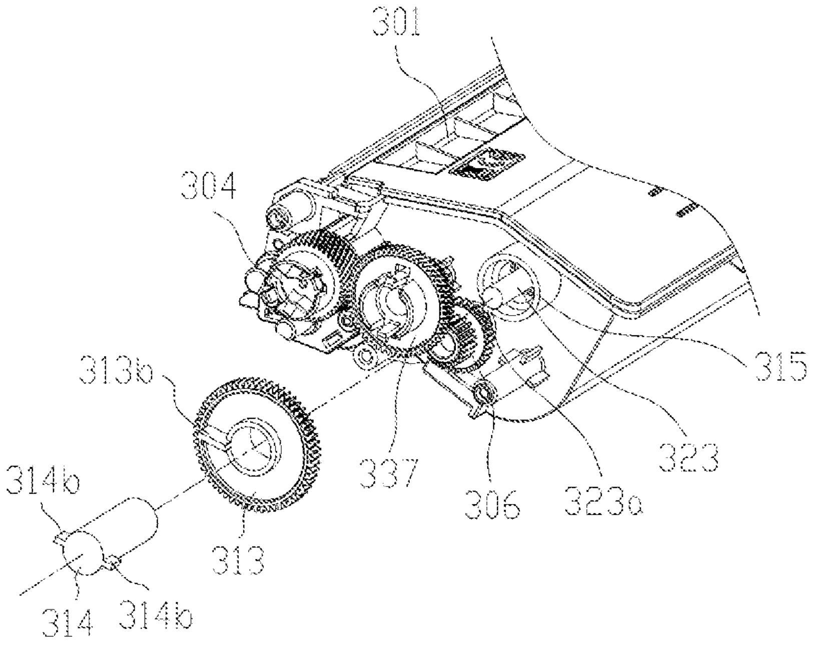
FIG. 18 is an exploded schematic view showing that a transmission gear and a first transmission component are disassembled from the developing cartridge according to Embodiment 3.
Figure 19:
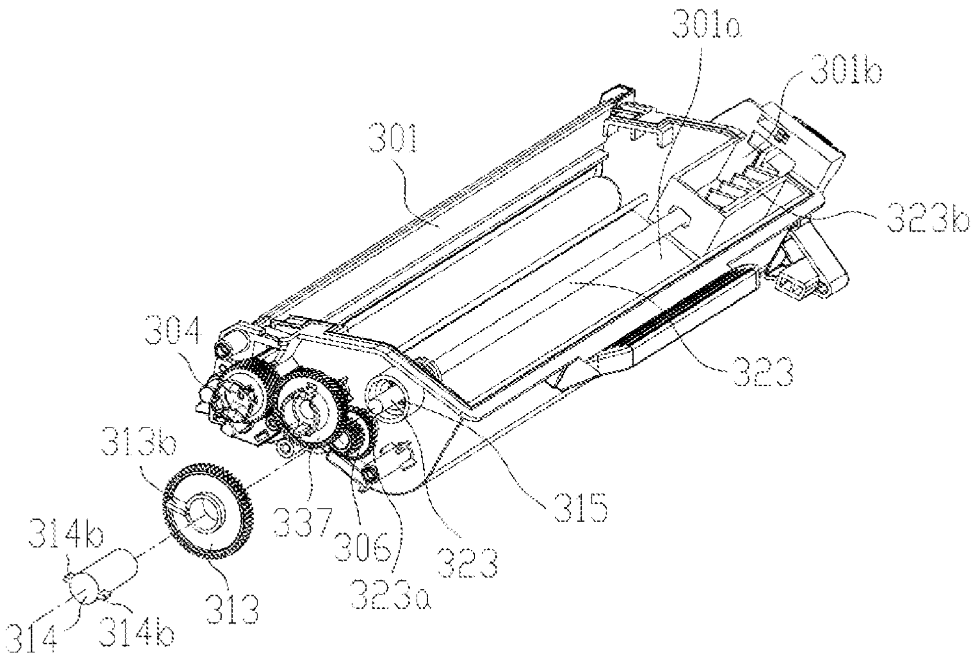
FIG. 19 is an exploded schematic view showing that the transmission gear and the first transmission component are disassembled from the developing cartridge according to Embodiment 3 after an upper cover of a housing is removed.
Figure 20:
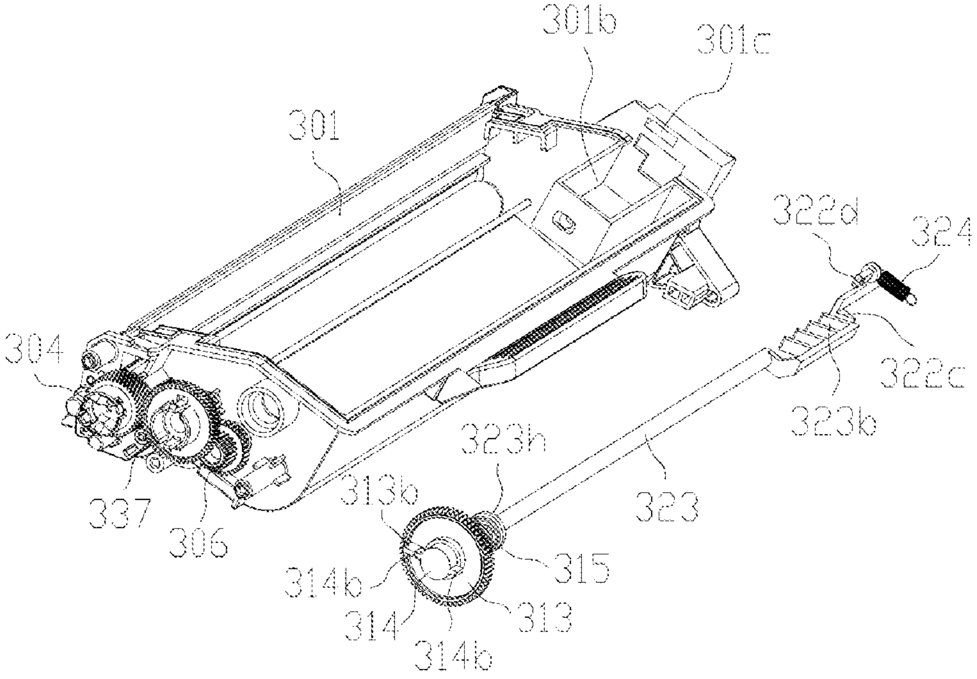
FIG. 20 is an exploded schematic view showing that a detection structure is disassembled from the developing cartridge according to Embodiment 3.
Figure 21:
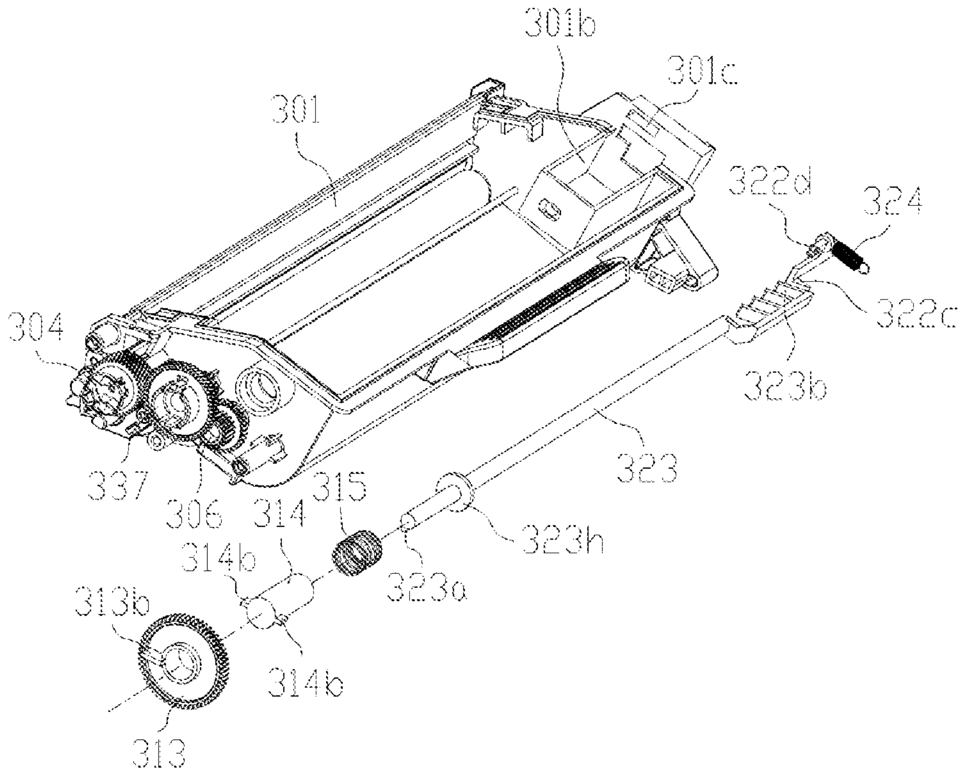
FIG. 21 is an exploded schematic view of the detection structure of the developing cartridge according to Embodiment 3 from an angle.
Figure 22:
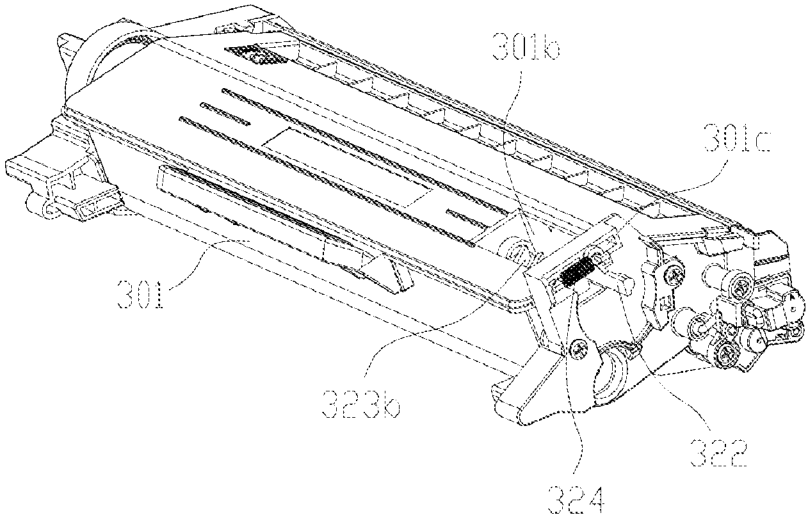
FIG. 22 is a schematic view of the developing cartridge according to Embodiment 3 from another angle.
Figure 23:
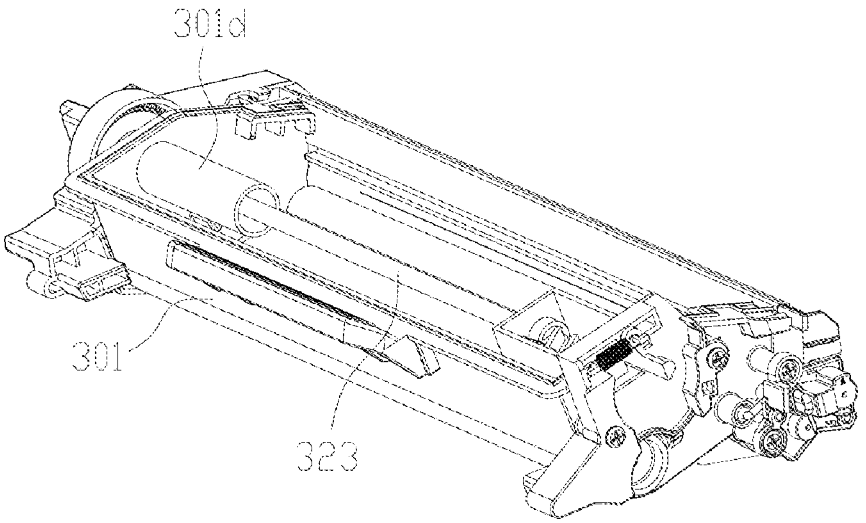
FIG. 23 is a schematic view of the developing cartridge according to Embodiment 3 after the upper cover of the housing is removed.
Figure 24:
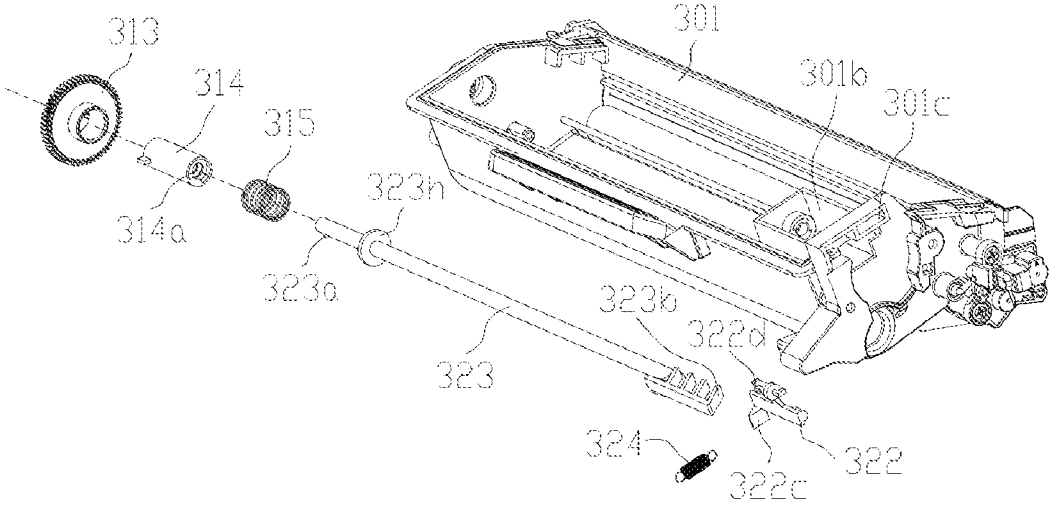
FIG. 24 is an exploded schematic view of the detection structure of the developing cartridge according to Embodiment 3 from another angle.
Figure 25:
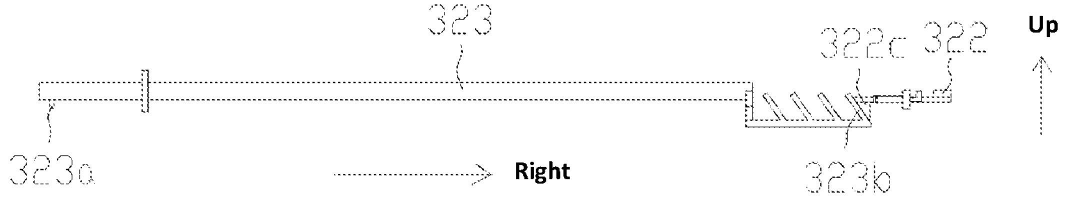
FIG. 25 is a schematic view of the developing cartridge according to Embodiment 3 before a second transmission component pushes a toggle member.
Figure 26:
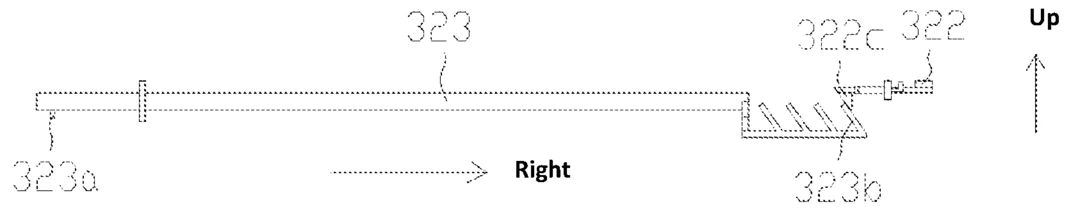
FIG. 26 is a schematic view of the developing cartridge according to Embodiment 3 when the second transmission component pushes the toggle member.

An electronic imaging device (e.g., a printer) may include a mechanism for detecting the presence or characteristics of a consumable part (e.g., a developing cartridge). The consumable part may have an electronic or mechanical component that the electronic imaging device may sense. For example, the electronic or mechanical component may cause a physical movement of the mechanism when the consumable part is installed into the electronic imaging device.

Embodiment 1

First, as shown in FIGS. 1 to 6, a developing cartridge of the present disclosure is detachably mounted in a drum assembly (not shown), and may be detachably mounted in an image forming apparatus together with the drum assembly. The developing cartridge includes a housing 1, a developer roller 2, a handle 3, a coupling gear 4, an agitator shaft 7, a developer feeding roller 9, an electrode 21 and a toggle member 22. The housing 1 has a developer accommodating portion 1*a* that can accommodate a developer, and a first hole 17 and a second hole 27 that are provided at left and right ends, respectively. The first hole 17 and the second hole 27 are through holes formed in left and right end side walls ("left end side" interchangeably referred to as "first side" and "right end side" interchangeably referred to as "second side") of the housing 1, respectively. The developer roller 2 and the developer feeding roller 9 are rotatably supported by the housing 1. The developer roller 2 may rotate about an axis of the developer roller extending in a left and right direction, and the developer feeding roller 9 may rotate about an axis of the developer feeding roller extending in the left and right direction. At least a part of the agitator shaft 7 is located in the developer accommodating portion 1*a* of the housing 1. The developer roller 2, the developer feeding roller 9, and the agitator shaft 7 (to be described in detail below) of the developing cartridge are defined to be sequentially arranged in a front and rear direction. The developer roller 2 is arranged on a front end side of the developing cartridge in the front and rear direction. The handle 3 is arranged on a rear end side of the developing cartridge in the front and rear direction. The front and rear direction of the developing cartridge is perpendicular to the left and right direction described above. The side of the developing cartridge where the coupling gear 4 is located is a driving side 10 of the developing cartridge, and the driving side 10 is a left end side of the housing 1 in the left and right direction. The electrode 21 is configured to span left and right ends of the housing 1. The electrode 21 is electrically connected to the developer roller 2 and the developer feeding roller 9. The electrode 21 has an electrical contact surface 21*a*, and the electrical contact surface 21*a* may be in electrical contact with a power supply component in the image forming apparatus. The side where the electrical contact surface 21*a* is located is provided on a conductive side 20 of the developing cartridge, and the driving side 10 and the conductive side 20 are located at two side ends of the housing 1 in the left and right direction, respectively. The toggle member 22 is used to toggle a detection body (not shown) in the image forming apparatus, so as to output to the image forming apparatus information such as whether the developing cartridge is a new cartridge or not or page yield of the developing cartridge. That is to say, the toggle member 22 as a detected body may be detected by the image forming apparatus.

The driving side 10 of the developing cartridge includes a coupling gear 4, a developer roller gear 5, a developer feeding roller gear (not shown) and an agitator gear 6. The coupling gear 4 may be engaged with a driving shaft in the image forming apparatus to receive a driving force. The developer roller gear 5 and the developer feeding roller gear are both in contact with and engaged with the coupling gear 4, and can drive the developer roller 2 and the developer feeding roller 9 to rotate, respectively. The agitator gear 6 is also engaged with the coupling gear 4 and can follow the rotation of the coupling gear 4 to rotate. The left end of the agitator shaft 7 is connected to the agitator gear 6, and may be driven to rotate by the agitator gear 6. The driving side 10 of the developing cartridge is further provided with a driving side protective cover 19. The driving side protective cover 19 is arranged to cover at least a part of the coupling gear 4, the developer roller gear 5, the developer feeding roller gear and the agitator gear 6. The driving side 10 of the developing cartridge is further provided with a storage component 11 and a storage component mounting frame 12 supporting the storage component 11. The storage component 11 stores relevant information of the developing cartridge and may establish a communication connection with the image forming apparatus. The storage component mounting frame 12 is detachably mounted on the driving side protective cover 19. Optionally, the storage component mounting frame 12 may also be configured to be detachably mounted on the housing 1, which is not limited. The agitator shaft 7 further includes a rod portion 8 extending axially (in the left and right direction) outward from the left end of the agitator shaft 7. A first transmission protrusion 8*a* and a second transmission protrusion 8*b* are formed extending radially outward on the outer peripheral surface of an end of the rod portion 8 close to the driving side 10. The first transmission protrusion 8*a* is arranged in the center closer to the agitator shaft 7 relative to the second transmission protrusion 8*b* in the left and right direction. Preferably, one first transmission protrusion 8*a* is provided, one pair of second transmission protrusions 8*b* are provided, and the pair of second transmission protrusions 8*b* are arranged at an interval along the outer circumferential surface of the rod portion 8 in the rotational direction of the rod portion 8. The agitator gear 6 includes one gear part 6*c* engaged with the coupling gear 4 and a pair of coupling portions 6*b* coupled with the second transmission protrusions 8*b*. The coupling portion 6*b* is a groove formed on the inner surface of the agitator gear 6. The second transmission protrusion 8*b* may be coupled with the coupling portion 6*b* of the agitator gear 6 to drive the agitator shaft 7 to rotate. The inner surface of the agitator gear 6 further includes a spiral groove 6*a* extending in the left and right direction. The spiral groove 6*a* is arranged on the right end closer to the developing cartridge in the left and right direction relative to the coupling portion 6*b*. The first transmission protrusion 8*a* on the rod portion 8 may cooperate with the spiral groove 6*a* and slide on the spiral groove 6*a*. The first transmission protrusion 8*a* can force the agitator shaft 7 to move in the left and right direction by means of an axial force generated by sliding on the spiral groove 6*a*. Specifically, the agitator shaft 7 has a first position and a second position, and the agitator shaft 7 in the first position is closer to the left end of the developing cartridge relative to the agitator shaft 7 in the second position. That is to say, when the agitator shaft 7 moves from the first position toward the second position, the agitator shaft 7 as a whole moves from the left end to the right end. When the agitator shaft 7 is in the first position, the second transmission protrusion 8*b* is not coupled with the coupling portion 6*b* so that the agitator gear 6 cannot drive the agitator shaft 7 to rotate. When the agitator shaft 7 is in the second position, the second transmission protrusion 8*b* is coupled with the coupling portion 6*b*, so that the agitator gear 6 can drive the agitator shaft 7 to rotate. When the developing cartridge is a new developing cartridge, the agitator shaft 7 is in the first position.

The conductive side 20 of the developing cartridge includes a toggle member 22, a transmission component 23, a holding component 24 and a conductive side protective cover 29, and the conductive side protective cover 29 is mounted on a conductive side 20 of the developing cartridge in such a manner as to cover at least a part of the transmission component 23, wherein the transmission component 23 is sleeved on a right end portion of the agitator shaft 7 and coaxially arranged with the agitator shaft 7, and at least a part of the transmission component 23 is accommodated in the second hole 27 of the housing 1, and is movably supported by the housing 1. Specifically, the transmission component 23 may move in the left and right direction relative to the housing 1. The transmission component 23 may be composed of a single component or a plurality of components. Preferably, one transmission component 23 is provided, and the transmission component 23 is sequentially provided with a first restricting portion 23*b*, a second restricting portion 23*c*, and a pushing portion 23*a* from left to right. Preferably, the first restricting portion 23*b*, the second restricting portion 23*c*, and the pushing portion 23*a* are all configured as protrusions formed on the transmission component 23, wherein the pushing portion 23*a* may push the detection body in the image forming apparatus to be detected by the image forming apparatus. Preferably, there is a pair of first restricting portions 23*b*, and the pair of first restricting portions 23*b* are arranged at an interval along the rotational direction of the transmission component 23 on the outer circumferential surface of the transmission component 23. In the axial direction, at least a part of the first restricting portion 23*b* is located outside the left end part of the second hole 27. That is to say, during the left and right movement of the transmission component 23, the first restricting portion 23*b* may abut against the right end side wall of the housing 1 to prevent the transmission component 23 from falling off from the housing 1, and the second restricting portion 23*c* is snapped into a bar-shaped groove 1*c* provided in the second hole 27 to limit the rotation of the transmission component 23 during the movement process. That is to say, the second restricting portion 23*c* is provided on the transmission component 23, so that the transmission component 23 can only move axially, and the problem that the pushing portion 23*a* provided on the transmission component 23 cannot push the toggle member 22 due to the rotation of the transmission component 23 can be further avoided, thereby improving the pushing accuracy. The toggle member 22 may be arranged on the conductive side protective cover 29 in such a manner that it can slide relative to the conductive side protective cover 29. Preferably, a pair of sliding guide rails 26 are provided on the conductive side protective cover 29, and a pair of grooves 22*a* matching the sliding guide rails 26 are provided on the toggle member 22. The grooves 22*a* may be snapped into the pair of sliding guide rails 26 and can slide along the sliding guide rails 26 at least in an up and down direction. The toggle member 22 further includes a toggle portion 22*b* and a pushed portion 22*c*. The toggle portion 22*b* is used to contact the detection body in the image forming apparatus during the movement of the toggle member 22 and may toggle the detection body to move. When the transmission component 23 moves, the pushing portion 23*a* provided on the transmission component 23 pushes the pushed portion 22*c* to move the toggle member 22, wherein the number of pushed portions 22*c* is not limited, may be one or two or more, and may be specifically set according to the number of times for different developing cartridges that the toggle member 22 needs to toggle the detection body. The holding component 24 is arranged on the conductive side 20 of the developing cartridge. Preferably, a spring with a simple structure is used for the holding component 24. The holding component 24 is sleeved on the transmission component 23, one end thereof abuts against the right end side wall of the housing 1, and the other end abuts against the first restricting portion 23*b* of the transmission component 23. That is to say, the holding component 24 is limited between the housing 1 and the transmission component 23 to prevent it from falling off, and the holding component 24 may be used to urge the agitator shaft 7 to move close to the driving side 10. In other words, the holding force provided by the holding component 24 may keep the agitator shaft 7 stable in the first position, preventing the developing cartridge from forcing the agitator shaft 7 to leave the first position due to transportation or artificial external force, so that the transmission component 23 cannot push the toggle member and cause the toggle member to be unable to toggle the detection body of the image forming apparatus, resulting in the problem that the developing cartridge cannot be detected or fails to be detected. Further, sealing rings 25 are provided in the first hole 17 and the second hole 27 of the developing cartridge, respectively, and a pair of sealing rings 25 are sleeved on the left end of the agitator shaft 7 and the transmission component 23, respectively. The developing cartridge is provided with the sealing rings, which may be used to prevent the developer from leaking out from the developer accommodating portion 1*a* when the agitator shaft 7 and the transmission component 23 are moving.

Next, a process in which the developing cartridge is detected by the detection body of the image forming apparatus will be specifically described. First, when the coupling gear 4 does not receive the driving force in the image forming apparatus, the agitator shaft 7 is in the first position. At this time, the second transmission protrusion 8*b* of the agitator shaft 7 is not coupled with the coupling portion 6*b* of the agitator gear 6, and the first transmission protrusion 8*a* is engaged in the spiral groove 6*a* of the agitator gear 6. When the coupling gear 4 receives the driving force in the image forming apparatus and is driven to rotate, the coupling gear 4 transmits the driving force to the agitator gear 6 and drives the agitator gear 6 to rotate. However, since the second transmission protrusion 8*b* on the agitator shaft 7 is not coupled with the coupling portion 6*b* of the agitator gear 6 at this time, the agitator gear 6 in the rotation process generates a thrust force close to the right end in the axial direction only by means of the engagement of the spiral groove 6*a* and the first transmission protrusion 8*a*, so that the agitator shaft 7 can push the agitator shaft 7 to move from the left end to the right end against the elastic force of the holding component 24. At the same time, after the agitator shaft 7 starts to move, the agitator shaft 7 urges the transmission component 23 to move from the left end to the right end, that is, the transmission component 23 extends gradually to the right in the left and right direction. In the process of the transmission component 23 extending to the right, a pushing inclined surface 23*a*1 provided on the pushing portion 23*a* contacts and exerts force on the pushed inclined surface 22*c*1 on the pushed portion 22*c*, so that the toggle member 22 moves upward in the up and down direction. Optionally, since the transmission component 23 is provided with the pushing inclined surface 23*a*1, the pushed portion 22*c* on the toggle member 22 may not be provided with the pushed inclined surface 22*c*1, or only one of the two is provided with an inclined surface, which is not limited. It should be understood that the moving direction of the transmission component 23 does not need to completely overlap with the left and right direction. The transmission component 23 may move at an angle in the left and right direction, as long as its moving direction has a component in the left and right direction. In other words, the transmission component 23 only needs to move at least in the left and right direction. Similarly, the toggle member 22 also only needs to move at least in the up and down direction. In this embodiment, it is preferable that the transmission component 23 moves along the left and right direction, and the toggle member 22 moves along the up and down direction, so as to better describe the process of the developing cartridge being detected.

It should be noted that the toggle member 22 may toggle the detection body multiple times by being provided with a plurality of pushed portions 22*c*. The toggle member 22 may move back and forth in the up and down direction, and the detection body in the image forming apparatus itself has an elastic element for returning (not shown in the figure). When the toggle member 22 is required to toggle the detection body multiple times, each time the toggle member 22 toggles the detection body once, the detection body may return to a position where it can be toggled by the toggle member 22 again, that is, the detection body may move back and forth between a non-toggle position and a toggle position, so as to realize the detection of developing cartridges of different specifications. Moreover, the detection body in the image forming apparatus is further provided with a power supply component. The power supply component may supply power to the developer roller 2 and the developer feeding roller 9 in the developing cartridge, and in the process of the detection body being toggled to move, the inside of the image forming apparatus will identify whether the detection body is toggled by means of the electrical signal detection component connected to the power supply component.

Embodiment 2

Next, Embodiment 2 of the present disclosure will be introduced. Embodiment 2 shows a developing cartridge. For the same parts as the developing cartridge in Embodiment 1 described above, they will not be described in detail again in Embodiment 2. Embodiment 2 will focus on describing in detail the parts different from Embodiment 1 described above. The difference between Embodiment 2 and Embodiment 1 described above is that what pushes the transmission component to move may not be the agitator shaft, or it may be a separate rod to push the transmission component. The rod is different from the agitator shaft, that is, the force that pushes the transmission component to move may be generated by a rod that is different from the agitator shaft. Next, the solution in Embodiment 2 will be described in detail.

As shown in FIGS. 7-14, the agitator shaft 217 of this embodiment is configured so that it does not move left and right after receiving the driving force of the coupling gear 204, but it only rotates to agitate the developer in the housing 201. Therefore, to achieve the technical effect of pushing the toggle member 222 left and right, in this embodiment, the structure of the developing cartridge is changed and a new transmission structure is proposed. Specifically, the developing cartridge further includes a transmission component 223 arranged on the outer surface of the upper end of the housing 1. Of course, optionally, the transmission component 223 may also be arranged on the outer surface of the lower end of the housing 1 or inside the housing 1, which is not limited. The transmission component 223 is configured as a rod spanning the left and right ends of the housing 201. The transmission component 223 includes a first transmission part 223*d* and a first bending part 223*c* arranged at the left end, a second transmission part 223*f* and a second bending part 223*e* at the right end, and a middle connection part 223*g* of connecting the first bending part 223*c* and the second bending part 223*e*, wherein the first bending part 233*c* is connected between the first transmission part 223*d* and the middle connection part 223*g*, and separates the first transmission part 223*d* and the middle connection part 223*g* on different planes in the up and down direction. Specifically, in the up and down direction, the first transmission part 223*d* is located at the lower end of the middle connection part 223*g*. The second bending part 223*e* is connected between the second transmission part 223*f* and the middle connection part 223*g*, and separates the second transmission part 223*f* and the middle connection part 223*g* on different planes in the up and down direction. Specifically, in the up and down direction, the second transmission part 223*f* is located at the lower end of the middle connection part 223*g*. A first transmission protrusion 223*a* is formed on the outer surface of the first transmission part 223*d*. The first transmission protrusion 223*a* may be engaged with the spiral groove 206*a* on the agitator gear 206, so that when the agitator gear 206 receives the driving force of the coupling gear 204 to rotate, the axial force generated by the engagement of the first transmission protrusion 223*a* and the spiral groove 206*a* makes the agitator gear 206 push the transmission component 223 to move to the right during the rotation process. Therefore, the pushing portion 223*b* on the second transmission part 223*f* arranged at the right end can push the toggle member 222 to at least move upward, so that the toggle member 222 can toggle the detection body of the image forming apparatus to realize the detection function. The agitator gear 206 further includes a coupling portion 206*b* that may be coupled with the agitator shaft 207, and through the coupling of the two, the agitator gear 206 can drive the agitator shaft 207 to rotate. Further, the first transmission part 223*d*, the first bending part 223*c*, the second transmission part 223*f*, the second bending part 223*e* and the middle connection part 223*g* described above are integrally formed. Compared with a split transmission component, the integrally formed structure reduces the number of molds required for manufacturing the transmission component, thereby reducing the production cost. Moreover, the integrally formed structure makes it unnecessary to assemble the transmission component into a whole, thereby reducing the difficulty and time of assembling the developing cartridge, and improving the assembling efficiency. However, optionally, the first transmission part 223*d*, the first bending part 223*c*, the second transmission part 223*f*, the second bending part 223*e*, and the middle transmission part 223*g* may also be arranged separately, which is not limited. Only a preferred embodiment is used in this embodiment. Further, to prevent the middle transmission part 223*g* from being deformed when the transmission component 223 is forced to move to the right, a reinforcing rib may also be provided on the middle transmission part 223*g* or a limiting portion may be provided on a housing 201 outside the transmission component to avoid its deformation, so that the force can be stably transmitted. Further, in this embodiment, a holding component similar to that in the above embodiment may also be provided, so that the transmission component 223 in this embodiment can be stably held in the first position, preventing the developing cartridge from being forced to leave the first position due to transportation or artificial external force so that the transmission component 223 cannot push the toggle member 222, and thus the toggle member 222 cannot toggle the detection body of the image forming apparatus, resulting in the problem that the developing cartridge cannot be detected or fails to be detected.

Provided in this embodiment is a new transmission component which is different from the agitator shaft that can move left and right. The new transmission component is simple in structure and easy to assemble. Moreover, because the transmission component is arranged outside the housing, it also further reduces the developer leakage phenomenon that occurs during the movement of the transmission component. Further, because the transmission component is arranged outside the housing, it can reduce the resistance of the small transmission component in the process of moving left and right, further improving the stability of power transmission.

Embodiment 3

Next, Embodiment 3 of the present disclosure will be introduced. Embodiment 3 provides a new developing cartridge. For the same parts as those in the preceding embodiments, they will not be repeated in this embodiment. The difference is that the developing cartridge and the detection structure of the developing cartridge are changed. Next, the new detection structure will be described in detail.

As shown in FIGS. 15-27, the left end of the developing cartridge is further provided with a coupling gear 304 that can receive a driving force of an image forming apparatus, an agitator gear 306 engaged with an agitator, and a storage component (not shown) that can store information. However, the developing cartridge in this embodiment further includes a first transmission gear 337 connected between the coupling gear 304 and the agitator gear 306 and a second transmission gear 313 engagement with the agitator gear 306. That is to say, the second transmission gear 313 can receive the driving force of the coupling gear 304 transmitted through the first transmission gear 337 and the agitator gear 306 to rotate. The second transmission gear 313 has a first surface facing a housing 301 and a second surface opposite to the first surface without facing the housing 301. A driving portion 313*b* configured as a protrusion is formed on the second surface. The developing cartridge further includes a driven member 314 that is also arranged on the left end of the developing cartridge with the second transmission gear 313. The driven member 314 is arranged coaxially with the second transmission gear 313. The driven member 314 includes a pair of driven portions 314*b* which are also configured as protrusions. The pair of driven portions 314*b* are arranged at an interval on the outer peripheral surface of the driven member 314. Preferably, the two portions are arranged at an interval of 180 degrees in the rotational direction of the driven member 314. When the developing cartridge is a new cartridge, the driven member 314 is arranged such that one of the driven portions 314*b* abuts against the driving portion 313*b* of the second transmission gear 313. When the developing cartridge is mounted in the image forming apparatus and driven, the second transmission gear 313 is driven by the coupling gear 304 to rotate counterclockwise, so that the driving portion 313*b* of the second transmission gear 313 is out of contact with the driven portion 314*b* of the driven member 314 in the rotational direction and rotates between the pair of driven portions 314*b*. At this time, the driven member 314 still does not rotate and remains stationary until the driving portion 313*b* contacts the other driven portion 314*b* in the rotational direction. At this time, the driven member 314 is driven to start to rotate. The inner peripheral surface of the driven member 314 is further provided with a spiral groove 314*a*. The structure and function of the spiral groove 314*a* are similar to those of the spiral groove described in the above embodiments, and will not be repeated here.

Similarly, the transmission component 323 of the developing cartridge in this embodiment is supported by the housing 301 and at least partly arranged in the developer accommodating portion 1*a* of the housing 1. Optionally, the transmission component 323 may also be arranged outside the housing 301, and the transmission component 323 is configured to span the left and right ends of the housing 1. As in the previous embodiments, the left end portion of the transmission component 323 is further provided with a first transmission protrusion 323*a* that can be engaged with the spiral groove 314*a* of the driven member 314. Similar to the previous embodiments, when the developing cartridge is a new cartridge and the second transmission gear 313 drives the driven member 314 to start rotating, the spiral groove 314*a* is engaged with the first transmission protrusion 323*a* to generate a thrust force forcing the transmission component 323 to move rightward, that is to say, the rotation of the driven member 314 can force the second transmission component 323 to move to the right. Of course, the structure for transforming the rotational motion into the translational motion is not limited to the matching structure between the spiral groove 314*a* and the first transmission protrusion 323*a* used in this embodiment and the above embodiments, and a structure in which a worm screw and a rack cooperate or other structures, for example, may also be used, but a preferred transmission structure is used in the present disclosure. The left end of the transmission component 323 is further provided with a blocking portion 323*h*. The blocking portion 323*h* is configured as an annular protrusion extending radially outward from the outer surface of the transmission component 323. The blocking portion 323*h* is arranged adjacent to the first transmission protrusion 323*a*, and is arranged in a position closer to the center of the transmission component 323 relative to the first transmission protrusion

323*a* in the left and right direction. A holding component 315 is also provided between the left end side wall of the housing 301 and the blocking portion 323*h*. Further, the holding component 315 is preferably a compression spring with simple structure and low cost. When the developing cartridge is a new cartridge, the holding component 315 is arranged between the left end side wall of the housing 301 and the blocking portion 323*h* in a compressed manner. As the transmission component 323 moves to the right, the compression amount of the holding component 315 gradually decrease until the first transmission protrusion 323*a* of the transmission component 323 is disengaged from the spiral groove 314*a* of the driven member 314. At the moment when the two are disengaged, the elastic force accumulated in the holding component 315 in the compressed state is released, urging the transmission component 323 to accelerate to move to the right. However, the first transmission protrusion 323*a* detached from the spiral groove 314*a* will cause the left end part of the transmission component 323 to lose support. Further, referring to FIG. 23, to avoid the occurrence of this situation, a supporting portion 301*d* is further provided on the housing 301. The supporting portion 301*d* is a hollow pipe extending rightward from the left end side wall of the housing 301. The left end part of the transmission component 323 is accommodated in the supporting portion 301*d*. When the first transmission protrusion 323*a* is disengaged from the spiral groove 314*a*, the left end part of the transmission component 323 will be supported by the supporting portion 301*d*, so that the left end part of the second transmission component 323 will not become unstable due to the loss of support.

At least one pushing portion 323*b* is provided at the right end of the transmission component 323. The specific number of pushing portions 323*b* and the interval between adjacent pushing portions 323*b* may be set according to the specifications of different developing cartridges, which is not limited. The developing cartridge in this embodiment is provided with four pushing portions 323*b* for illustration. The four pushing portions 323*b* are arranged at intervals in the left and right direction, and the pushing portions 323*b* are accommodated in a pushing portion accommodating portion 301*b* arranged on the upper end of the right side of the housing 301, so that the pushing portion 323*b* is not provided in the developer accommodating portion 301*a* and is exposed outside. With this structure, it is possible to avoid the phenomenon that the movable and complex-shaped pushing portion 323*b* is provided in the developer accommodating portion 301*a*, making the developer accommodating part 301*a* not well sealed and resulting in developer leakage. A plurality of pushing portions 323*b* may push the pushed portion 322*c* of the toggle member 322 to make the toggle member 322 (interchangeably referred to as "toggle protrusion" or "first protrusion") move back and forth, so that the toggle member 322 toggles the detection body of the image forming apparatus back and forth several times to make the developing cartridge detected. Further, similar to Embodiment 1 or 2 described above, the pushing portion 323*b* is provided with a pushing inclined surface, and the pushed portion 322*c* is provided with a pushed inclined surface. When the pushing portion 323*b* pushes the pushed portion 322*c*, the inclined surfaces are pushed to contact each other, so as to make it easier for the transmission component 323 to push the toggle member 322, and the movement is smoother. Optionally, only one of the pushing portion 323*b* and the pushed portion 322*c* may be provided with an inclined surface, and the same technical effect may also be achieved. Moreover, it should be understood that the moving direction of the transmission component 323 does not need to completely overlap with the left and right direction, and the transmission component 323 may move along a direction at an angle with the left and right direction, as long as its moving direction has a component in the left and right direction, in other words, the transmission component 323 moves at least in the left and right direction. In this embodiment, it is preferable that the transmission component 323 moves along the left and right direction so as to better describe the detection process of the developing cartridge. To realize that the toggle 322 stably toggles the detection body of the image forming apparatus back and forth, the toggle member 322 is further provided with a sliding portion 322*d*, and the right end side wall of the housing 301 is provided with a track portion 301*c* for the sliding portion 322*d* to slide. When the toggle member 322 is toggled by force, the sliding portion 322*d* may slide along a predetermined track provided by the track portion 301*c*. Further, the sliding portion 322*d* is configured as an elastic buckle. It not only enables the sliding portion 322*d* to slide stably on the track portion 301*c*, but also enables the toggle member 322 to be detachably mounted on the housing 301 through the elastic buckle structure while preventing it from accidentally falling off from the housing 301, so that the structure of the toggle member is simplified, and the installation or removal of the toggle member 322 becomes simpler and more convenient. Further, the developing cartridge also includes a first elastic member 324. The first elastic member 324 is connected between the housing 301 and the toggle member 322, and is used to reset the toggle member 322 after the toggle member 322 is pushed by the transmission component 323, so that the toggle member 322 can toggle the detection body of the image forming apparatus back and forth. Further, the first elastic member 324 is preferably a tension spring.

Figure 27:
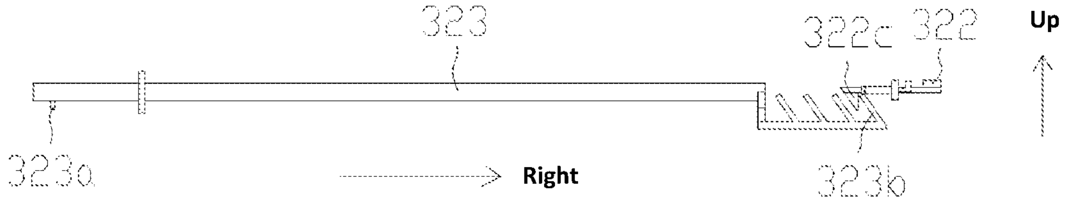
FIG. 27 is a schematic view of the developing cartridge according to Embodiment 3 when the second transmission component no longer pushes the toggle member.
Figure 28:
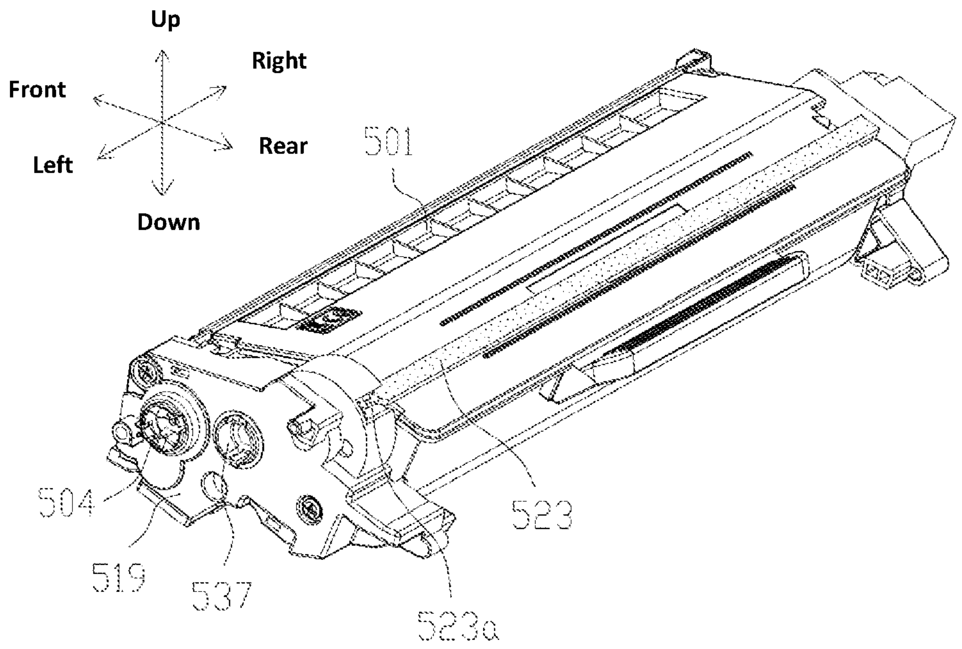
FIG. 28 is a schematic view of a developing cartridge according to Embodiment 4.
Figure 29:
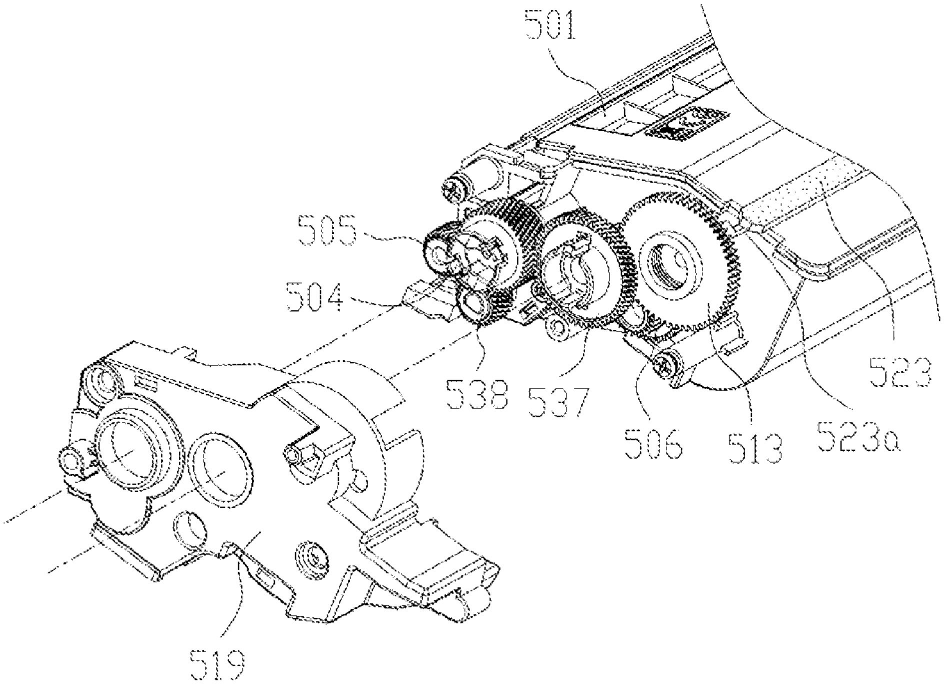
FIG. 29 is an exploded schematic view of the developing cartridge according to Embodiment 4 after a driving side protective cover is disassembled from the developing cartridge.
Figure 30:
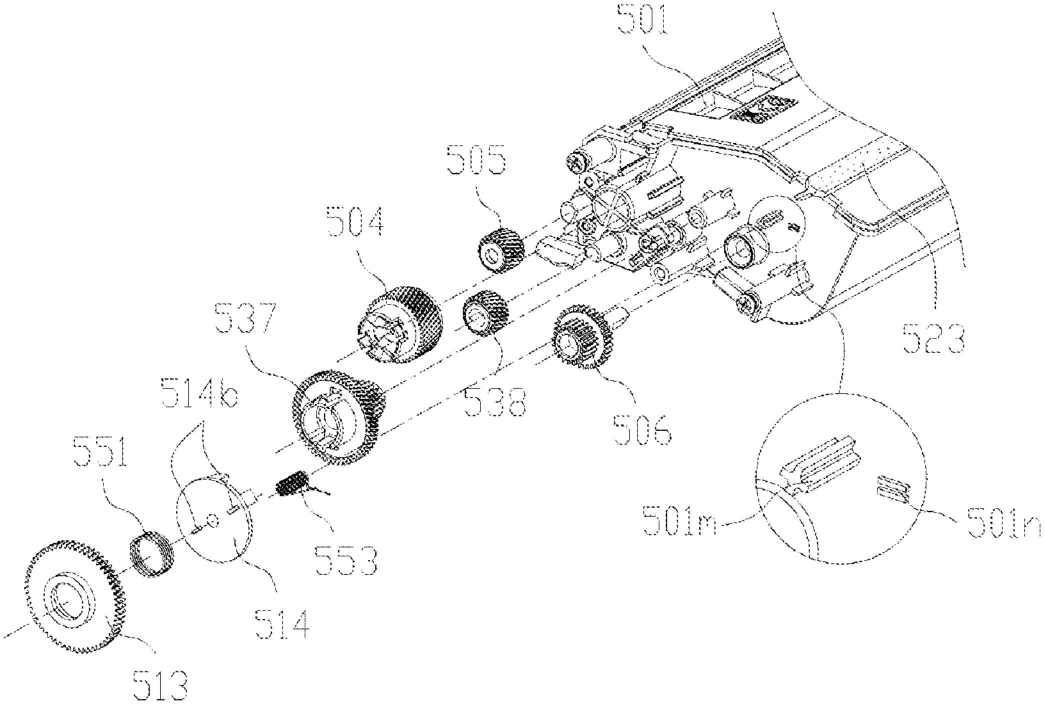
FIG. 30 is an exploded schematic view of a power assembly on a driving side of the developing cartridge according to Embodiment 4.
Figure 31:
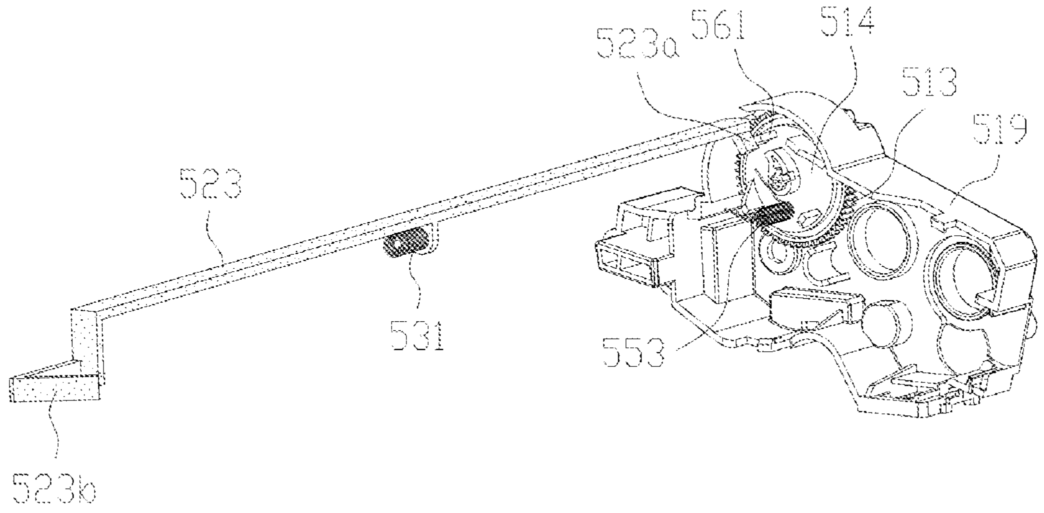
FIG. 31 is a schematic view of a detection assembly according to Embodiment 4 from an angle.
Figure 32:
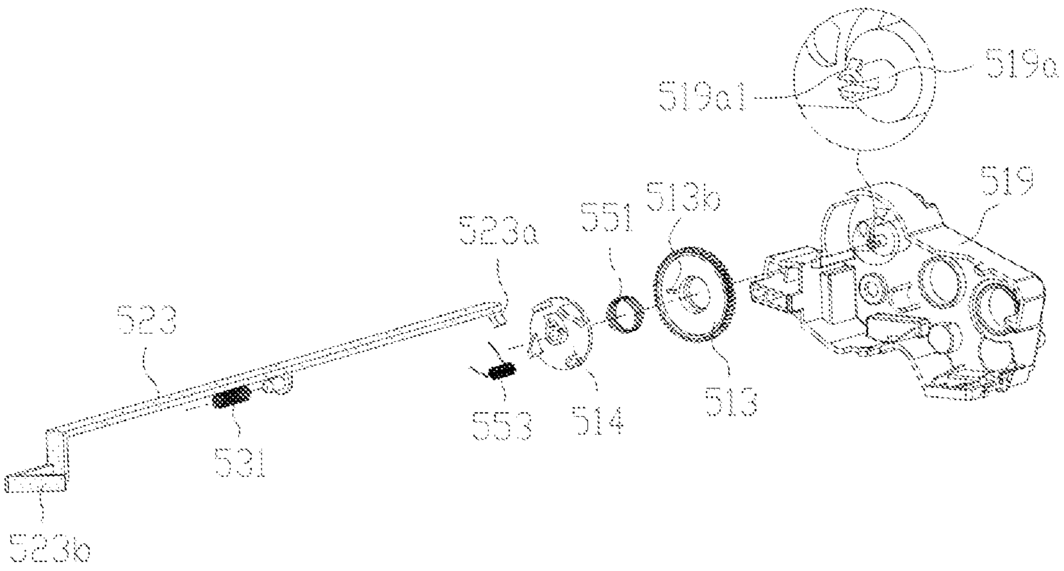
FIG. 32 is an exploded schematic view of the detection assembly according to Embodiment 4.
Figure 33:
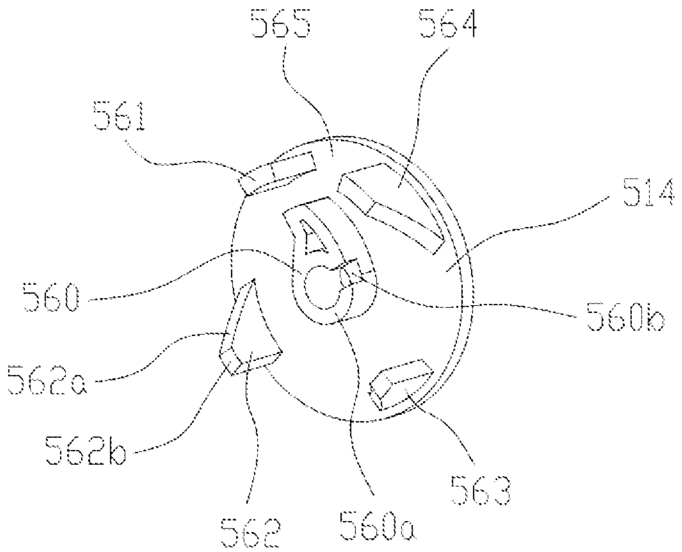
FIG. 33 is a schematic view of a first transmission component according to Embodiment 4.
Figure 34:
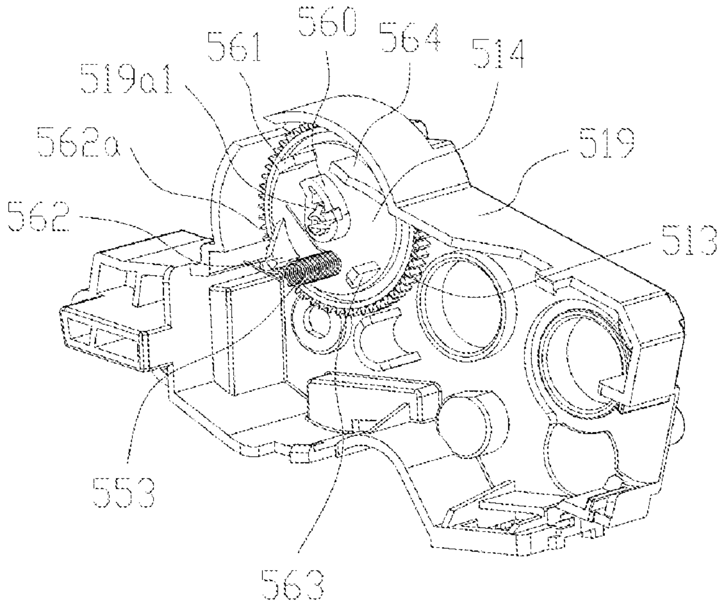
FIG. 34 is a schematic view of the detection assembly according to Embodiment 4 from another angle.
Figure 35:
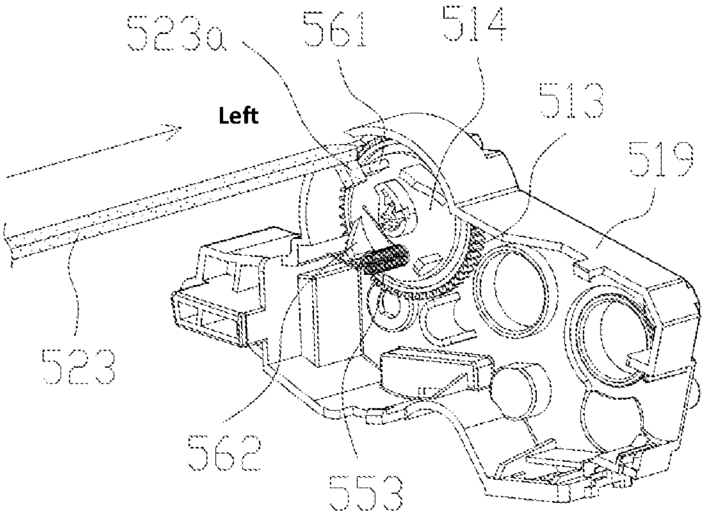
FIG. 35 is a schematic view of a second transmission component according to Embodiment 4 when it abuts against pushes an urging portion.
Figure 36:
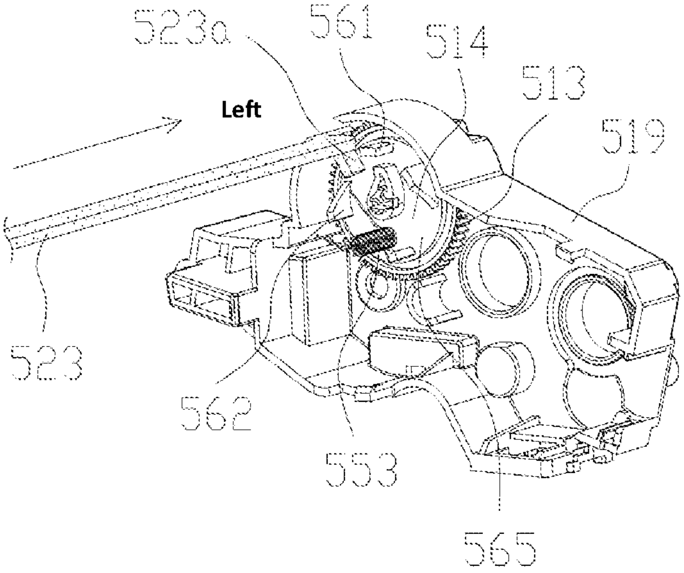
FIG. 36 is a schematic view of the second transmission component according to Embodiment 4 when it abuts against a main body portion of the first transmission component.
Figure 37:
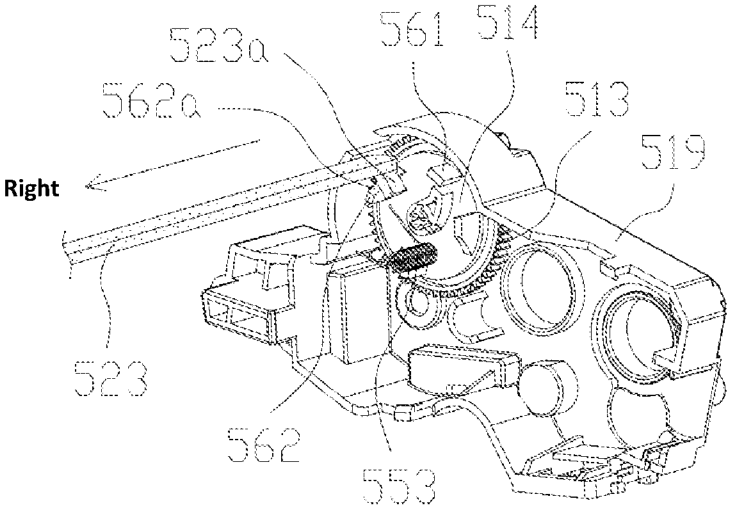
FIG. 37 is a schematic view of the second transmission component according to Embodiment 4 when it abuts against a guide surface of a second urging portion.
Figure 38:
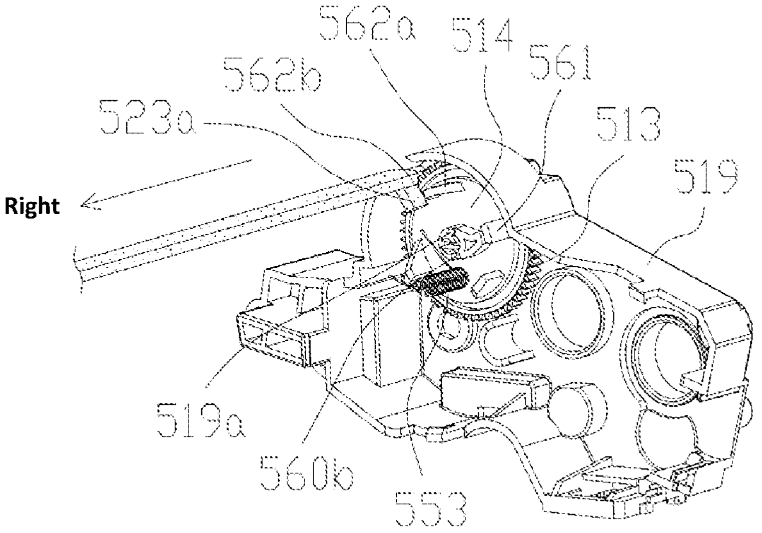
FIG. 38 is a schematic view of the second transmission component according to Embodiment 4 when it abuts against an urging surface of the second urging portion.
Figure 39:
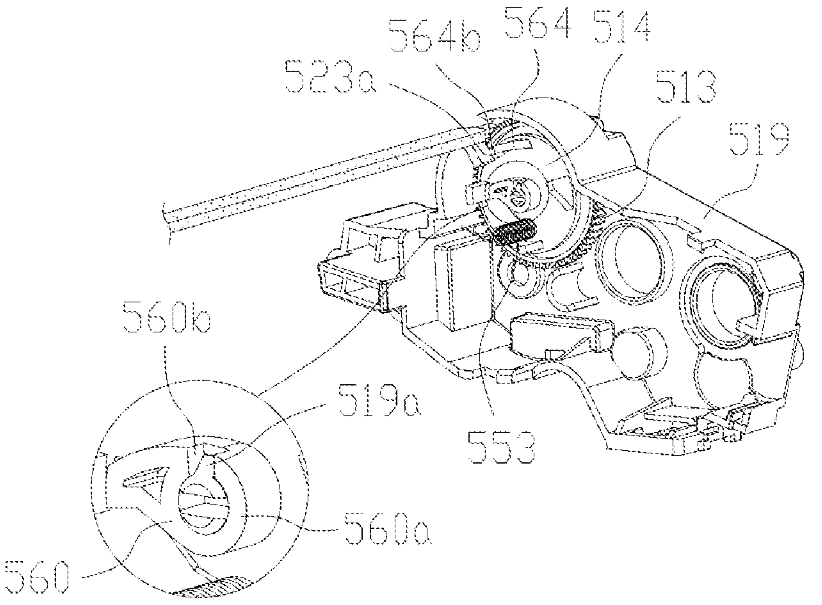
FIG. 39 is a schematic view according to Embodiment 4 at a detection termination position.
Figure 40:
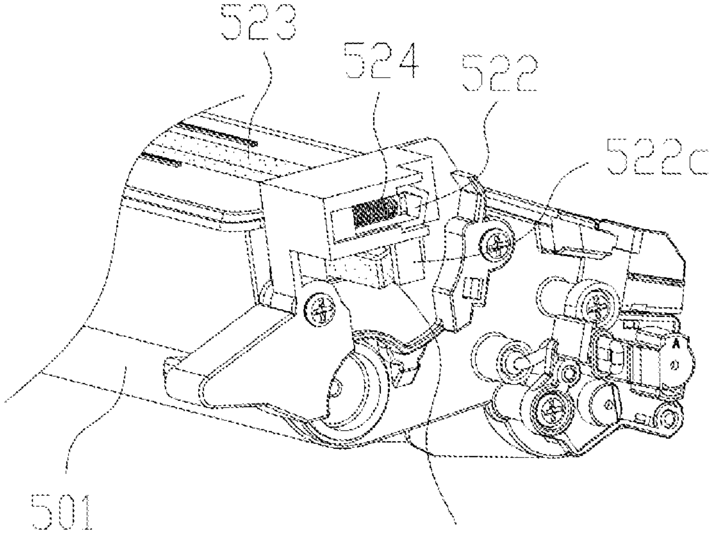
FIG. 40 is a schematic view of the developing cartridge according to Embodiment 4 when the toggle member is located at a non-toggle position.
Figure 41:
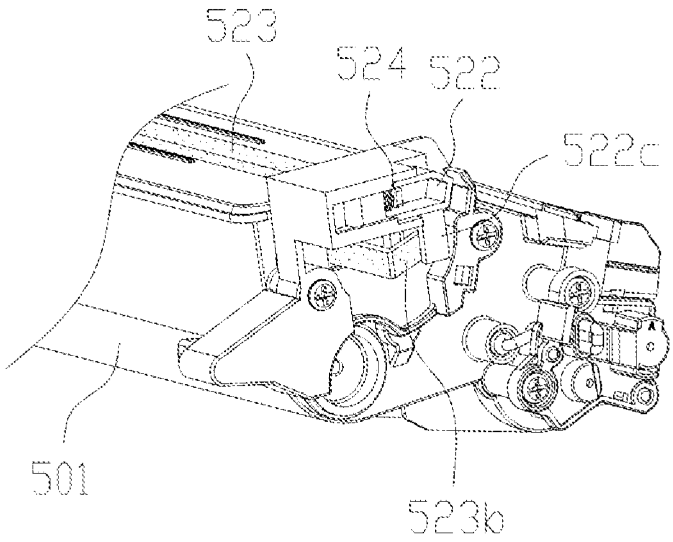
FIG. 41 is a schematic view of the developing cartridge according to Embodiment 4 when the toggle member is located at a toggle position.
Figure 42:
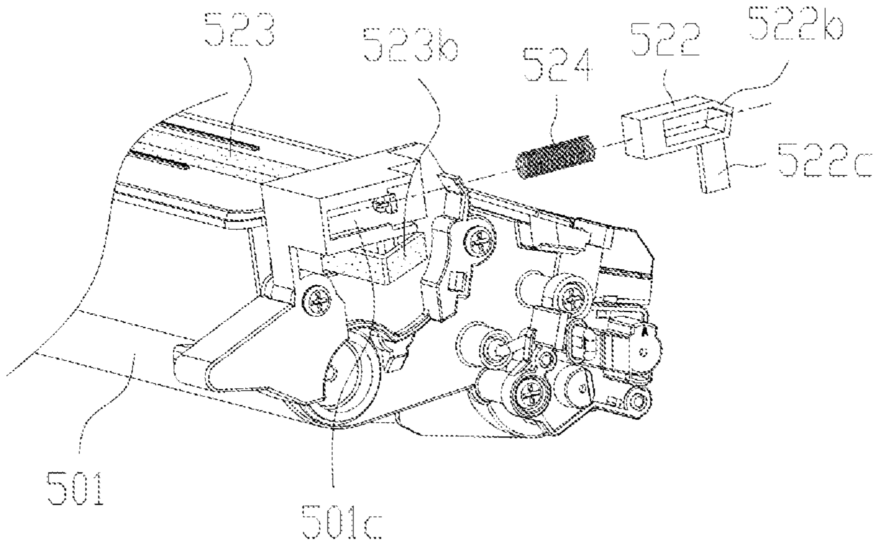
FIG. 42 is an exploded schematic view of the toggle member and a second elastic member at a right end of the developing cartridge according to Embodiment 4.

Next, a process in which the developing cartridge is detected by the detection body of the image forming apparatus will be specifically described. First, as a new developing cartridge, when the coupling gear 304 does not receive the driving force in the image forming apparatus, one of the driven portions 314*b* of the driven member 314 abuts against the driving portion 313*b* of the second transmission gear 313. When the developing cartridge is mounted in the image forming apparatus and driven, the second transmission gear 313 is driven by the coupling gear 304 to rotate counterclockwise, so that the driving portion 313*b* of the second transmission gear 313 is out of contact with the driven portions 314*b* of the driven member 314 in the rotational direction and rotates between the pair of driven portions 314*b*. At this time, the driven member 314 still does not rotate until the driving portion 313*b* contacts the other driven portion 314*b* in the rotational direction. At this time, the driven member 314 is driven to start rotating. Subsequently, the driven member 314 which starts rotating can generate a rightward thrust force by means of the engagement of the spiral groove 314*a* provided thereon and the first transmission protrusion 323*a* of the transmission component 323. The thrust force causes the transmission component 323 to be pushed rightward by the driven member 314. As the transmission component 323 moves to the right, the pushing portion 323*b* arranged at the right end of the transmission component 323 starts to push the pushed portion 322*c* of the toggle member 322. The toggle member 322 moves the sliding portion 322*d* on the track portion 301*c* against the elastic force of the first elastic member 324, so that the toggle member 322 moves from the position shown in FIG. 25 in which the detection body of the image forming apparatus is not pushed to a position in which the detection body of the image forming apparatus is pushed. At this time, the detection body that is toggled by the toggle member 322 records a toggle signal. Further, as shown in FIG. 27, the pushed portion 322*c* of the toggle member 322 will be out of contact with the pushing portion 323*b*, so that the toggle member 322 moves to a groove formed by two adjacent pushing portions 323*b* under the elastic force of the first elastic member 324. At this time, the toggle member 322 again returns to the position where the detection body of the image forming apparatus is not toggled. Similarly, the cooperation process of the three subsequent pushing portions 323*b* and the toggle member 322 is similar to that of the first pushing portion 323*b* and the toggle member 322, and will not be repeated here. It is worth mentioning that as the transmission component 323 gradually moves to the right, the compression amount of the holding component 315 will gradually decrease until the first transmission protrusion 323*a* of the transmission component 323 is about to be disengaged from the spiral groove 314*a* of the driven member 314. At the moment when the two are disengaged, the elastic force accumulated in the holding component 315 that is still in the compressed state is released, and the elastic force is applied to the transmission component 323 and can urge the transmission component 323 to acceleratingly move to the right, so that the pushing portion 323*b* accelerates to push the toggle member 322, and then the toggle member 322 accelerates to toggle the detection body of the image forming apparatus. The detection body can receive the accelerated toggle signal. Finally, the first transmission protrusion 323*a* is disengaged from the spiral groove 314*a*, the transmission component 323 will no longer move to the right, and the toggle member 322 will no longer move and will no longer toggle the detection body of the image forming apparatus. So far, the image forming apparatus has completed the entire detection process of the developing cartridge.

Embodiment 4

Next, Embodiment 4 in the present disclosure will be introduced. A developing cartridge is shown in Embodiment 4, and the same parts of the developing cartridge as the developing cartridge in Embodiment 3 described above will not be repeated. The difference is that the detection structure of the developing cartridge is changed in this embodiment. Next, the new detection structure will be described in detail.

As shown in FIGS. 39-53, first, the partial structure of the left end of the developing cartridge will be described. The left end of the developing cartridge is further provided with a coupling gear 504 that can receive the driving force of the image forming apparatus, a developer roller gear 505, a developer feeding roller gear 538, a first transmission gear 537, an agitator gear 506 and a second transmission gear 513 that can be driven by the coupling gear 504, and a driving side protective cover 519 covering the above gears, wherein the driving side protective cover 519 is provided with a protruding column 519*a* on a side toward a housing 501. An abutted protrusion 519*a*1 is provided at a free end of the protruding column 519*a*. The protruding column 519*a* and the abutted protrusion 519*a*1 are configured as a buckle structure formed on the driving side protective cover 519. The buckle structure can be abutted against and buckled on the driven member 514 to prevent the driven member 514 and the second transmission gear 513 from falling off from the driving side protective cover 519. Similarly, the second transmission gear 513 may receive a driving force of the coupling gear 504 transmitted through the first transmission gear 537 and the agitator gear 506 to rotate. The second transmission gear 513 has a first surface facing the housing 501 and a second surface opposite to the first surface and not facing the housing 501. A driving portion 513*b* configured as a protrusion is formed on the first surface.

The developing cartridge further includes a driven member 514 which is also arranged on the left end of the developing cartridge with the second transmission gear 513, and a transmission member 523 which can be urged to move by the driven member 514 and spans the left and right ends of the housing 501. Further, the driven member 514 is arranged coaxially with the second transmission gear 513, which makes the structure of the developing cartridge more compact and facilitates the miniaturization of the developing cartridge. Unlike the driven member in the above embodiments, the driven member 514 in this embodiment has a basic structure similar to that of a toothed disc. The driven member 514 includes a driven member main body portion 565 configured in a disc shape, and a pair of driven portions 514*b* protruding from the driven member main body portion 565 toward the second transmission gear 513 side in the left and right direction. The pair of driven portions 514*b* are configured as protrusions, and the pair of driven portions 514*b* are arranged at an interval in the rotational direction of the driven member main body portion 565. Preferably, the pair of driven portions 514*b* are arranged at an interval of 180 degree on the rotational direction of the driven member main body portion 565. When the developing cartridge is a new cartridge, the driven member 514 is arranged such that one of the driven portions 514*b* abuts against the driving portion 513*b* of the second transmission gear 513. When the developing cartridge is mounted in an image forming apparatus and driven, the second transmission gear 513 is driven by the coupling gear 504 to rotate counterclockwise, so that the driving portion 513*b* of the second transmission gear 513 is out of contact with the driven portion 514*b* of the driven member 514 in the rotational direction and rotated between the pair of driven portions 514*b*. At this time, the driven member 514 still does not rotate and remains stationary until the driving portion 513*b* contacts the other driven portion 514*b* in the rotational direction. At this time, the driven member 514 is driven to start rotating. That is to say, such a configuration makes the driven member 514 remain stationary when the coupling gear 504 is just driven to rotate. The driven member 514 will start rotating after the coupling gear 504 rotates for a period of time. In other words, the developing cartridge has the function of delay detection. Such a structure is similar to that in Embodiment 3 described above, so it will not be repeated here. The driven member 514 further includes an urging portion protruding from the driven member main body portion 565 toward the housing 501 side in the left and right direction. The urging portion is configured as a protrusion (interchangeably referred to as "second protrusion" or "urging protrusion"), and there is at least one urging portion. Further, there are four urging portions in this embodiment, namely, a first urging portion 561, a second urging portion 562, a third urging portion 563 and a fourth urging portion 564 arranged at intervals in the rotational direction of the driven member main body portion 565. Optionally, 1-3 or 4 or more urging portions are may also be provided. The urging portions may be specifically provided according to the model specifications of the developing cartridge. Further, the second urging portion 562 includes an urging surface 562*b* and a guide surface 562*a* adjacent to the urging surface 562*b*, and, in the rotational direction of the driven member 514, the urging surface 562*b* is arranged upstream of the guide surface 562*a*. The urging surface 562*b* is located on a different plane from the surface of the driven member main body portion 565 facing the housing 501 side, and is closer to the right end of the developing cartridge relative to the driven member main body portion 565 in the left and right direction. One end of the guide surface 562*a* is adjacent to the driven member main body portion 565, and the other end is adjacent to the urging surface 562*b*. In other words, the guide surface 562*a* is inclined from the driven member main body portion 565 toward the urging surface 562*b*, and the guide surface 562*a* may be used to guide the urged portion 523*a* located at the left end of the transmission component 523 to move to the urging surface 562*b*. In other words, when the driven member 514 rotates, the guide surface 562*a* can smoothly push the transmission component 523 to move from left to right. The structures and functions of the third urging portion 563 and the fourth urging portion 564 are the same as those of the second urging portion 562, which will not be repeated here. Further, the driven member 514 also includes an abutting portion 560 protruding from the driven member main body portion 565 toward the housing 501 side. Viewed from the right end to the left end, the shape of the abutting portion 560 has a basic structure of a cam. The abutting portion 560 includes an abutting surface 560*a* and an abutting groove 560*b*. A plane where the abutting surface 560*a* is located is closer to the right end of the developing cartridge in the left and right direction than the first surface of the driven member main body portion 565 facing the housing 501 side, and the abutting groove 560*b* is formed by inwardly recessing from the abutting surface 560*a*. When the developing cartridge is a new cartridge or the developing cartridge is in the process of detection, the abutted protrusion 519*a*1 of the driving side protective cover 519 abuts against the abutting surface 560*a*. At this time, the driving portion 513*b* of the second transmission gear 513 abuts against the driven portion 514*b* of the driven member 514 and can drive the driven member 514 to rotate. When the detection is completed, the abutted protrusion 519*a*1 is out of contact with the abutting surface 560*a* and abuts against the abutment groove 560*b*. At this time, the driving portion 513*b* of the second transmission gear 513 is axially disengaged from the driven portion 514*b* of the driven member 514, so that the driven member 514 cannot be driven to rotate. That is to say, after the detection of the developing cartridge is completed, the driven member 514 cannot be driven, and then the driven member 514 will not push the transmission member 523 to move in the left and right direction.

Further, the developing cartridge also includes a second elastic member 553. The second elastic member 553 is preferably a torsion spring, and includes a main body part and a first extension portion and a second extension portion respectively extending from the left and right ends of the main body part. The main body part of the second elastic member 553 is sleeved on a positioning column 501*m* on the left end wall of the housing 501. The first extension portion is mounted in a positioning slot 501*n* also located on the left end wall of the housing 501 to be positioned, and the second extension portion leans against the outer surface of the abutting portion 560 configured as a cam. During the rotation of the driven member 514, the second elastic member 553 may be twisted to accumulate elastic force. After the urged portion 523*a* of the transmission component 523 is out of contact with the third pushing portion 563 of the driven member 514, the elastic force accumulated by the twisting of the second elastic portion 553 is released, and the elastic force acts on the abutting portion 560 and may force the driven member 514 to acceleratingly rotate.

Further, to make it easier for the abutted protrusion 519*a*1 that is out of contact with the abutting surface 560*a* to enter the abutting groove 560*b* stably and quickly after the detection of the developing cartridge is completed, the developing cartridge is further provided with a third elastic member 551. The elastic member 551 abuts between the driven member 514 and the second transmission gear 513, and when the abutted protrusion 519*a*1 abuts on the abutting surface 560*a*, the third elastic member 551 is in a compressed state and accumulates an elastic force. The elastic force has a tendency to urge the driven member 514 to move toward the right end. When the abutted protrusion 519*a*1 is out of contact with the abutting surface 560*a* and faces the abutting groove 560*b*, the accumulated elastic force is released to urge the driven member 514 to move to the right end. At this time, the abutted protrusion 519*a*1 enters the abutment groove 560*b* on the moved driven member 514. Thus, the driven portion 514*b* of the driven member 514 is axially disengaged from the driving portion 513*b* of the second transmission gear 513. Further, the third elastic member 551 is a compression spring, which has a simple structure and stable performance.

Further, during the detection process of the developing cartridge, it is necessary to toggle the detection body of the image forming apparatus several times to complete the detection. To this end, the developing cartridge is further provided with a holding component 531. The holding component 531 is mounted in the approximately central position of the housing 501 in the left and right direction, the holding component 531 abuts between the transmission component 523 and the housing 501, and may be used to reset the moved transmission component 523, Specifically, when the developing cartridge is a new cartridge, the urged portion 523*a* of the transmission component 523 abuts against the first urging portion 561 of the driven member 514 against the elastic force accumulated in the holding component 531. At this time, the transmission component 523 tends to move leftward (that is, it is close to the driven member 514 side in the left and right direction) due to the elastic force of the holding component 531, and the transmission component 523 in this position is in a position where the detection body of the image forming apparatus may be toggled by the toggle member 522. With the rotation of the driven member 514, the urged portion 523*a* is gradually out of contact with the first urging portion 561, and the transmission component 523 will move to the left under the action of the elastic force of the holding component 531 until it abuts against the driven member main body portion 565 and stops moving. The transmission component 523 in this position is in a position where the detection body of the image forming apparatus is not toggled. That is to say, the holding component 531 has a tendency to force the transmission component 523 to move from the position where the detection body of the image forming apparatus is toggled to the position where the detection body of the image forming apparatus is not toggled, so as to reset the transmission component 523 after it moves.

As shown in FIGS. 51-53, similar to Embodiment 3 described above, the right end of the developing cartridge in this embodiment likewise includes a movable toggle member 522 and a first elastic member 524 abutting between the toggle member 522 and the housing 501. The toggle member 522 includes a toggle portion 522*b* that can toggle the detection body of the image forming apparatus and a pushed portion 522*c* that can be pushed by the pushing portion 523*b* of the transmission component 523. Moreover, after receiving the pushing force of the pushing portion 523*b*, the toggle member 522 can slide along the track portion 501*c* provided on the housing 501, and the elastic force generated by the first elastic member 524 can be used to keep the toggle member 522 in a non-toggle position where the detection body of the image forming apparatus is not toggled. When the toggle member 522 is pushed to move by the pushing portion 523*b* of the transmission component 523 moving to the right, the toggle member 522 moves, against the elastic force generated by the compression of the first elastic member 524, to a toggle position where the detection body of the image forming apparatus may be toggled. When the transmission component 523 moves to the left, the pushing portion 523*b* will no longer push the toggle member 522. At this time, the toggle member 522 returns to the non-toggle position again under the action of the elastic force accumulated on the first elastic member 524. That is to say, the first elastic member 524 may be used to reset the toggling member 522 from the toggle position to the non-toggle position. Further, the pushing portion 523*b* is provided with a pushing inclined surface to smoothly push the toggle member 522. Optionally, it is also possible that the pushing portion 523*b* and the pushed portion 522*c* is each provided with an inclined surface, or only the pushed portion 522*c* is provided with an inclined surface, all of which can achieve the above technical effects.

As shown in FIGS. 39-53, next, the process in which the developing cartridge is detected by the detection body of the image forming apparatus will be described in detail. First, as shown in FIG. 46, as a new developing cartridge, the urged portion 523*a* of the transmission member 523 abuts against the first urging portion 561 to keep the transmission component 523 in a pushing position where the pushing portion 523*b* pushes the pushed portion 522*c* of the toggle member 522, and the abutted protrusion 519*a*1 of the driving side protective cover 519 is abutted on the abutting surface 560*a*. After the user mounts the new developing cartridge into the image forming apparatus, the toggle member 522 is in a toggle position where the detection body of the image forming apparatus is toggled. With the start of the image forming apparatus, the coupling gear 504 is driven to rotate. Through the power transmission of the first transmission gear 537 and the agitator gear 506, the second transmission gear 513 is also driven to rotate in the counterclockwise direction, but the driving portion 513*b* of the subsequent second transmission gear 513 will rotate between the pair of driven portions 514*b* of the driven member 514 and will not drive the driven member 514 to rotate temporarily. With the further rotation of the second transmission gear 513, the driving portion 513*b* abuts against the other driven portion 514*b* and drives the driven member 514 to start rotating. That is to say, when the second transmission gear 513 starts rotating, the driven member 514 will not rotate immediately, but will start rotating after a period of time, with a certain delay. As shown in FIG. 47, With the rotation of the driven member 514, the urged portion 523*a* abutting against the first urging portion 561 is out of contact with the first urging portion 561, and the urged portion 523*a* is urged to move to the left under the elastic force of the holding component 531 until it abuts against the driven member main body portion 565 and stops continuing to move forward. With the further rotation of the driven member 514, as shown in FIG. 48, the urged portion 523*a* abuts against the guide surface 562*a* of the second urging portion 562, and under the guidance of the guide surface 562*a*, the transmission component 523 gradually moves to the right. The pushing portion 523*b* located at the right end of the transmission component 523 will push the toggle member 522 to move against the elastic force of the first elastic member 524, and then the toggle member 522 will push the detection body of the image forming apparatus. The image forming apparatus will detect the toggle signal. Further, as shown in FIG. 49, when the urged portion 523*a* is out of contact with the guide surface 562*a* and moves to contact with the urging surface 562*b*, the transmission component 523 will temporarily no longer move to the right. At this time, the pushing portion 523*b* will maintain the state of pushing the toggle member 522 and force the toggle member 522 to continue to toggle the detection body of the image forming apparatus. The image forming apparatus will detect and record the duration of the toggle signal again. However, with the further rotation of the driven member 514, the urged portion 523*a* is out of contact with the urging surface 562*b*, and is urged to move to the left under the elastic force of the holding component 531 until it abuts against the driven member main body portion 565 again. Next, the cooperating process between the urged portion 523*a* and the third urging portion 563 is similar to the cooperating process between the urged portion 523*a* and the second urging portion 562, and the transmission component 523 will repeat the previous action process, which will not be repeated here. With the further rotation of the driven member 514, the second elastic member 553 is twisted to accumulate an elastic force. Then, the elastic force is released and applied to the abutting portion 560 to accelerate the rotation of the driven member 514. Then, the urged portion 523*a* abuts against the fourth urging portion 564 and abuts on the urging surface of the fourth urging portion 564. At this time, the abutted protrusion 519*a*1 of the driving side protective cover 519 is out of contact with the abutting surface 560*a*, and the elastic force accumulated by the third elastic member 551 is released to urge the driven member 514, so that the abutted protrusion 519*a*1 enters the abutting groove 560*b* on the driven member 514, thereby urging the driven member 514 to move toward the right end. At this time, the driven portion 514*b* of the driven member 514 is axially disengaged from the driving portion 513*b* of the second transmission gear 513. So far, the driven member 514 can no longer receive the driving force from the second transmission gear 513 to rotate, so that the transmission component 523 will not move left and right. At this time, the transmission component 523 will again remain at a pushing position where the pushing portion 523*b* pushes the pushed portion 522*c* of the toggle member 522, and the toggle member 522 continues to abut against the detection body of the image forming apparatus. The image forming apparatus will receive the toggle signal again, and the detection process is terminated.

Beneficial Effects

After adopting the above technical solutions, a new developing cartridge detected assembly is provided, which adopts a spiral groove structure design or a gear disc structure design to transmit the driving force, so that the transmission component can move in the left and right direction. Compared with the existing gear transmission structure, this structure design has a smaller space. Therefore, the developing cartridge can be made thinner and smaller.

The above embodiments are only used to illustrate the technical solutions of the present disclosure, rather than to limit them. Although the present disclosure has been described in detail with reference to the foregoing embodiments, it should be understood by those of ordinary skill in the art that: it is still possible to modify the technical solutions described in the foregoing embodiments, or to perform equivalent replacements for some of the technical features. These modifications or replacements do not make the essence of the corresponding technical solutions deviate from the spirit and scope of the technical solutions in the embodiments of the present disclosure.

What is claimed is:

1. A developing cartridge, comprising:

a housing;

a developer roller supported by the housing and configured to rotate about an axis of the developer roller; and a coupling gear located on a first side of the housing, and configured to rotate by receiving a driving force;

a transmission rod configured to move in response to a rotation of the coupling gear, a first part of the transmission rod located on the first side of the housing;

a first protrusion movably mounted on a second side of the housing, and configured to move in response to a movement of the transmission rod; and a second protrusion on the first side of the housing, extending toward the second side of the housing, and the second protrusion comprising a guide surface configured to cause the transmission rod to move toward the second side of the housing in response to the rotation of the coupling gear.

2. The developing cartridge according to claim 1, wherein the guide surface is inclined with respect to the axis of the developer roller.

3. The developing cartridge according to claim 1, wherein the housing comprises a plate on the first side of the housing and supporting the second protrusion, wherein an included angle between an extending direction of the guide surface and an extending direction of the plate is an obtuse angle.

4. The developing cartridge according to claim 2, wherein the second protrusion further comprises an urging surface arranged adjacent to the guide surface, and the guide surface is inclined relative to the urging surface.

5. The developing cartridge according to claim 3, wherein the second protrusion further comprises an urging surface, one end of the guide surface is adjacent to the plate, and another end of the guide surface is adjacent to the urging surface.

6. The developing cartridge according to claim 5, wherein the extending direction of the plate is parallel to an extending direction of the urging surface.

7. The developing cartridge according to claim 1, further comprising a compression spring mounted on the transmission rod and configured to cause the transmission rod to move toward the second side of the housing, wherein one end of the compression spring abuts the housing and another end of the compression spring abuts the transmission rod, and the compression spring is configured to be compressed in response to the rotation of the coupling gear.

8. The developing cartridge according to claim 1, wherein a second part of the transmission rod is located on the second side of the housing, and wherein the first protrusion is mounted on the second part of the transmission rod and movable relative to the transmission rod.

9. The developing cartridge according to claim 1, wherein the first protrusion is configured to move in a direction different from a moving direction of the transmission rod, under a driving force from the transmission rod.

10. The developing cartridge according to claim 1, further comprising a transmission gear on the first side of the housing and configured to rotate in response to the rotation of the coupling gear, wherein the second protrusion is on the transmission gear.

11. The developing cartridge according to claim 10, wherein the guide surface of the second protrusion is configured to force the transmission rod to move by contacting the transmission rod.

12. The developing cartridge according to claim 11, further comprising an agitator inside the housing configured to agitate a developer, wherein the transmission gear is mounted at an end of the agitator.

13. The developing cartridge according to claim 12, further comprising two idler gears between the transmission gear and the coupling gear.

14. The developing cartridge according to claim 1, further comprising an electrode electrically connected to the developer roller, wherein the electrode has an electrical contact surface on the second side of the housing, and the electrical contact surface is between the developer roller and the transmission rod.

15. The developing cartridge according to claim 1, wherein the housing comprises a container configured to accommodate a developer, and the transmission rod is outside the container.

16. A developing cartridge, comprising:

a housing;

a developer roller supported by the housing and configured to rotate about an axis of the developer roller;

a developer feeding roller supported by the housing and configured to rotate about an axis of the developer feeding roller; and a coupling gear on a first side of the housing, and configured to rotate by receiving a driving force;

a transmission rod configured to move in response to a rotation of the coupling gear, a first part of the transmission rod located on the first side of the housing;

an elastic member between the housing and the transmission rod, configured to cause the transmission rod to move;

a first protrusion on a second side of the housing and configured to move in response to a movement of the transmission rod; and an electrode electrically connected to the developer roller or the developer feeding roller and having an electrical contact surface on the second side of the housing, wherein the electrical contact surface is between the developer roller and the transmission rod.

17. The developing cartridge according to claim 16, wherein the first protrusion is integrally molded with the transmission rod.

18. The developing cartridge according to claim 16, further comprising a transmission gear configured to move the transmission rod, wherein the elastic member is located on the first side of the housing, wherein the transmission gear is configured to cause the transmission rod to move against the elastic member, and when the transmission gear is disengaged from the transmission rod, the elastic member is configured to move the transmission rod.

19. The developing cartridge according to claim 18, wherein the elastic member is on the first side of the housing, the transmission gear, the transmission rod and the first protrusion are sequentially arranged along the axis of the developer roller.

20. The developing cartridge according to claim 16, wherein a protruding portion is provided on the transmission rod, and the elastic member is mounted on the protruding portion.

21. The developing cartridge according to claim 16, wherein the housing comprises a container configured to accommodate a developer, the transmission rod is located outside the container, and the elastic member is between the first side of the housing and the second side of the housing.

22. A developing cartridge, comprising:

a housing;

a developer roller supported by the housing and configured to rotate about an axis of the developer roller; and a coupling gear located on a first side of the housing, and configured to rotate by receiving a driving force;

a transmission rod configured to move in response to a rotation of the coupling gear, a first part of the transmission rod located on the first side of the housing, and a second part of the transmission rod located on a second side of the housing; and a first protrusion on the second side of the housing and configured to move in response to a movement of the transmission rod; and wherein the transmission rod is movably mounted on the housing, and the transmission rod is restricted to rotate about an axis parallel to the axis of the developer roller.

23. The developing cartridge according to claim 22, wherein the first protrusion is integrally molded with the transmission rod.

24. The developing cartridge according to claim 22, further comprising a second protrusion on the first side of the housing, extending toward the second side of the housing, and configured to cause the transmission rod to move relative to the housing in response to the rotation of the coupling gear.

25. The developing cartridge according to claim 22, further comprising an elastic member mounted on the transmission rod and configured to cause the transmission rod to move, wherein one end of the elastic member abuts the housing and another end of the elastic member abuts the transmission rod.

26. The developing cartridge according to claim 25, wherein a protruding portion is provided on the transmission rod, and the elastic member is mounted on the protruding portion.

27. The developing cartridge according to claim 22, wherein the housing comprises a container configured to accommodate a developer, the transmission rod is located outside the container, and the developing cartridge further comprises an elastic member between the first side of the housing and the second side of the housing.

* * * * *